INVENTOR.
ROSS C. ALDERSON
BERNARD W. LINDGREN

ATTORNEY

INVENTOR.
ROSS C. ALDERSON
BERNARD W. LINDGREN

ATTORNEY

March 22, 1966 R. C. ALDERSON ETAL 3,241,363
NAVIGATION INSTRUMENTS
Filed Dec. 4, 1958 17 Sheets-Sheet 9

FIG 9

March 22, 1966     R. C. ALDERSON ETAL     3,241,363

NAVIGATION INSTRUMENTS

Filed Dec. 4, 1958     17 Sheets-Sheet 11

FIG 11

INVENTOR.
ROSS C. ALDERSON
BERNARD W. LINDGREN
BY
ATTORNEY

INVENTOR.
ROSS C. ALDERSON
BERNARD W. LINDGREN

ATTORNEY

INVENTOR.
ROSS C. ALDERSON
BERNARD W. LINDGREN
BY Roger W. Jensen
ATTORNEY 3,241,363
NAVIGATION INSTRUMENTS
Ross C. Alderson, Golden Valley, and Bernard W. Lindgren, Minneapolis, Minn., assignors to Honeywell Inc., a corporation of Delaware
Filed Dec. 4, 1958, Ser. No. 778,090
13 Claims. (Cl. 73—178)

This invention relates to craft navigation systems and more particularly to a system for indicating the position of an aircraft relative to a starting point without the intervention or aid of any external data.

Navigation devices have been developed in the past employing radar or celestial type equipment which has been used to supplement a navigation system for determining direction and distance traveled from an initial point to a predetermined point of destination. The main reason for using the additional radar or celestial tracking equipment was to supervise the navigation systems to obtain the necessary accuracy required of the systems to perform their navigational task. Since the added equipment increases size and weight requirement and complexity, it becomes desirable to devise a system which will be entirely self-contained and non-radiating, which will perform the functions of navigation and, particularly, in craft or vehicles such as high speed aircraft operating at extremely high altitudes.

The present invention does not make use of any radar or celestial tracking devices to supervise the inertial system, but employs a pure inertial system for determining the horizontal distance and direction traveled over the earth's surface. The apparatus of the present invention employs a pair of accelerometers which are mounted on a three-axis platform and are compensated for pseudo accelerations sometimes referred to as Coriolis forces and centripetal forces. These corrections are necessitated by rotation of the measuring elements on the platform in inertial space in combination with the translation of the vehicle. Also the signals from the integrating accelerometers which are representative of the velocity of the craft acquired since start-up relative to the rotating surface of the earth are adjusted to represent the velocity of the craft divided by the distance corresponding to the radius of the earth. In other words these signals are representative of angular velocities and they in turn are altered in accordance with the distance the craft is above the earth, or in accordance with the altitude of the craft. Integration of the previously described angular velocity signal provides a measure of the distance that the craft has traveled. These angular velocity signals are the precession signals which are generated to precess the rotors of the gyros on the three-axis platform. The error signal from the gyro signal generating means is then applied to motor means which rotate the platform so that the accelerometers will maintain a north and east orientation, regardless of altitude.

It is, therefore, an object of the present invention to provide compensating or correction signals to the accelerometers of the system to compensate the accelerometers for accelerations caused by the Coriolis forces and centrifugal forces.

Another object of the present invention is to provide a system which senses the movement of the craft in a local vertical coordinate system and displays craft's position in a geographical or earth coordinate system, such as the polar system comprising latitude and longitude.

A further object of the present invention is to provide a computer for modifying the accelerometer and altimeter signals to generate precession signals for integrating gyros contained on the three-axis platform.

Another object of the present invention is to provide correction signals for Coriolis accelerations and centripetal accelerations utilizing a vertical rate signal independent of an inertial system.

These and other features of the invention will be understood more clearly and fully from the following detailed description and accompanying drawings in which:

FIGURES 1, 2, 3, and 4 are a semi-schematic diagram of the overall system;

FIGURE 9 is a switching circuit that show the relays which are used with the latitude and longitude loops;

FIGURE 11 is a detailed schematic of the east accelerometer and its associated circuitry;

Figure 1:
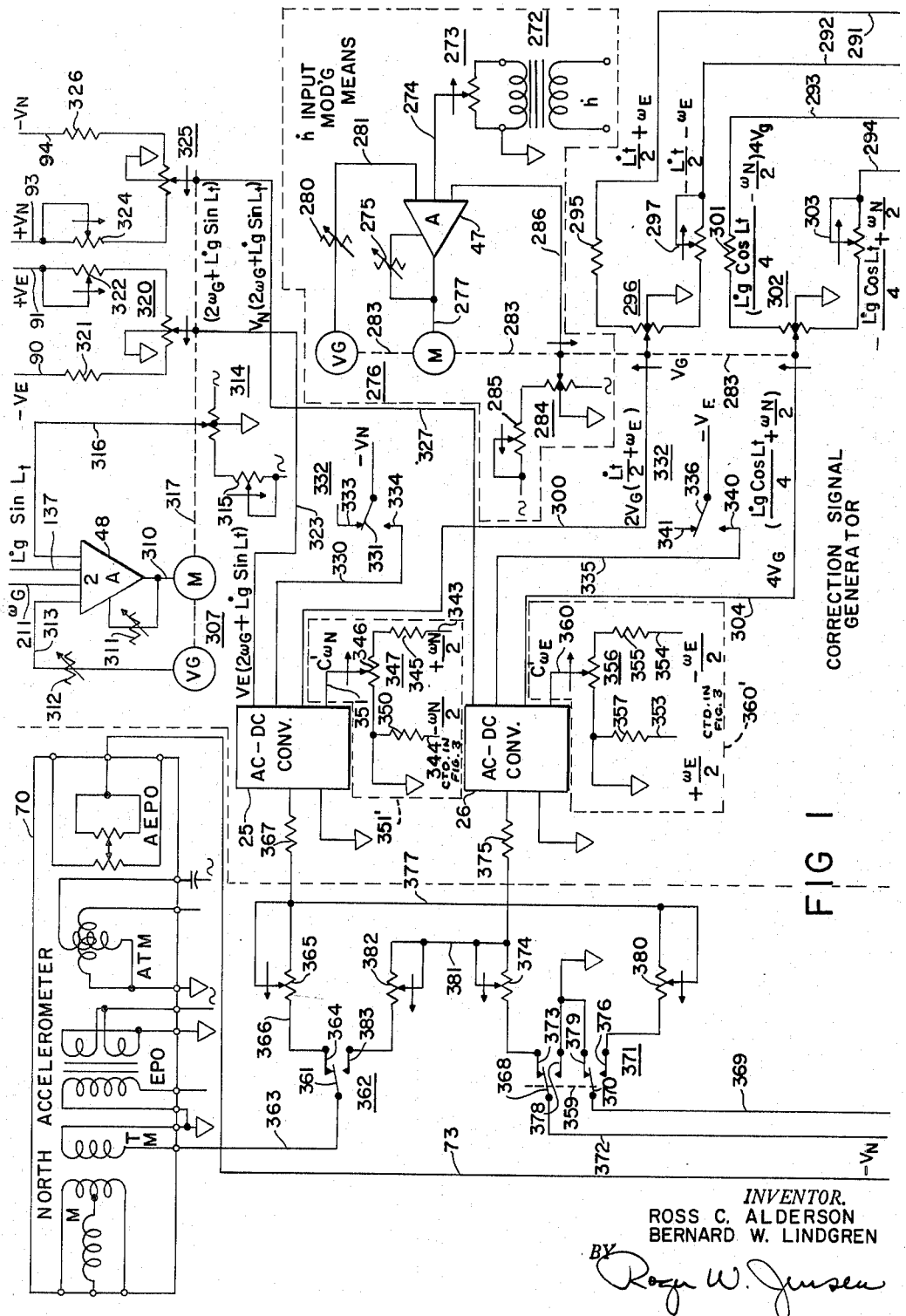

FIGURES 5 through 8 form the latitude loop and FIGURES 11 through 15 form the longitude loop. The actuating coils for most of the relays have been separately shown in FIGURE 9, and are designated by the subscript K associated with the reference number of the relay.

The present invention is embodied in an inertial system comprising a pair of pendulous integrating accelerometers mounted on a stable platform, consisting of three gyros and a gimballing system. The three gyros, through various synchros and servos to be explained in detail later, maintain the sensitive axes of the accelerometers in a prescribed orientation with relation to the earth, which in this preferred embodiment is north and east respectively. The input axes of the three gyros are oriented in mutually orthogonal directions (north, east and vertical) to detect any angular velocity of the platform. The physical location of these components can be seen in FIGURE 16.

The inertial system is prepared for operation by a series of steps which will be briefly explained here and more completely explained in conjunction with the circuitry later. The first step in preparing the system for operation is called "STANDBY MODE." In this step power is applied to all of the equipment and it is given an opportunity to warm up. There is of course much more than simply applying power to the system since the inertial components must be protected from damage during the warm up time. The second step is designated "COARSE ALIGN MODE" and during this step the inertial platform is aligned, approximately in the north, east and vertical directions. This may be accomplished by supplying externally produced signals to the servomotors of the various gimbals. During this period the platform is rotated so that the sensitive axis of the east accelerometer is aligned north and the sensitive axis of the north accelerometer is aligned east. This is done for alignment purposes and will be explained in more detail shortly. The third step is designated "GYRO SPIN MODE." During this step the spin motors of the inertial components are energized and brought to synchronous speed. The fourth step is called "GYRO STABILIZATION MODE" and during this step the gyros are switched into the various circuits including the gimbal servomotors, thereby gyro-stabilizing the system. The fifth step is called "ACCELEROMETERS ON MODE" and during this step the accelerometers are switched into their respective feedback systems and become operative in the system. The sixth step is designated "SELF-ALIGN MODE." During this step any component of earth's gravity sensed by the north accelerometer in its east position is applied, as an electrical signal to the proper gimbal servomotors. The servomotors tilt the platform to correspond to the input signal applied. The system not being in flight at this time, any accelerometer outputs are due only to inclination of the platform. The accelerometers pick up a component of the earth's gravity as soon as they are not longer horizontal. The accelerometers then produce signals proportional to the component of gravity sensed which are utilized to torque the gyros until the accelerometers no longer sense the component of gravity. The platform is then rotated 90° until the sensitive axis of the east accelerometer is aligned east and the sensitive axis of the north accelerometer is aligned north and the platform is again torqued until the accelerometers do not sense any acceleration. During this procedure various gyro drift compensation potentiometers and other calibration devices are properly adjusted. The manner in which the proper adjustments are determined will be explained in more detail later along with the circuitry. The inertial system is now properly aligned with the preselected earth coordinate system and it is switched into step seven, designated "FLIGHT MODE." The inertial system is now ready for use.

During the use or operation of the inertial system the prescribed orientation of the stable platform is maintained by the three gyros. Because one axis of the inertial system is maintained vertical at all times it is necessary to torque the gyros in some relation to the earth's rate of rotation and the speed of the dirigible craft along the north and east axes. Also corrections must be made due to errors caused by Coriolis forces and centripetal forces. These corrections are continuous and are explained more fully in conjunction with the associated circuitry. The two accelerometers, which have their sensitive axes horizontal to the earth's surface and oriented in two perpendicular directions (in this embodiment north and east), produce electrical outputs indicative of the acceleration of the dirigible craft. These electrical signals are integrated twice to give an electrical signal indicative of the distance traveled by the dirigible craft and these electrical signals are operated on by a computer which produces a continuous indication of the position of the craft with relation to the surface of the earth. Thus, the computer is continuously converting the accelerometer output signals, measured relative to the local vertical coordinate system of the inertial platform to the position of the dirigible craft in an earth coordinate system. It should be noted that in the present embodiment the axes of the local vertical coordinate system were chosen to be north, east, and vertical for ease of explanation and, thus, they are aligned with the chosen earth coordinate system. However, the axes of either of these coordinate systems could be aligned in any chosen direction and the particular directions chosen are not intended to limit this invention in any way.

Figure 16:
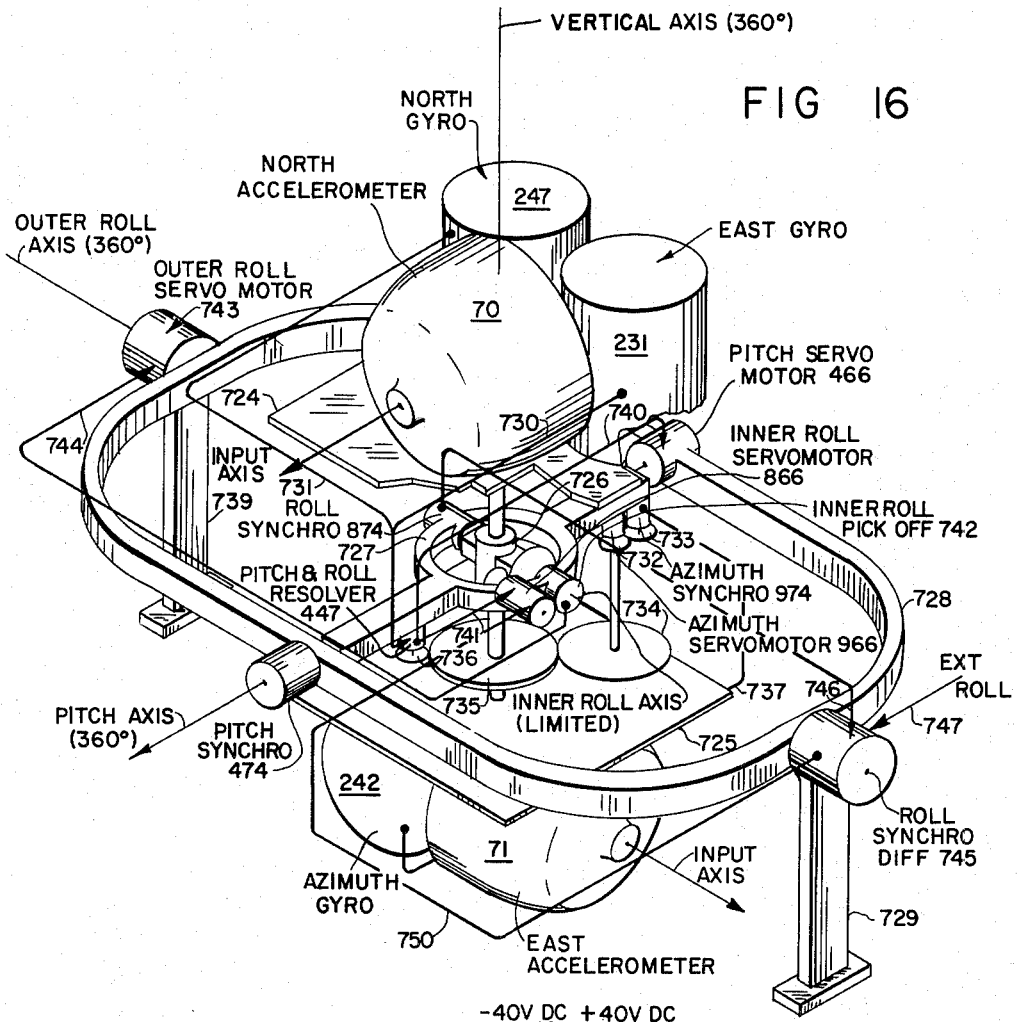
FIGURE 16 is a pictorial drawing of the placement of the components on the stable platform and the flow of information between the components.

An accelerometer 70, shown with its sensitive axis oriented parallel to the pitch axis in FIGURE 16 senses the acceleration of the system in the north and south directions and accelerometer 71, shown with its sensitive axis oriented parallel to the outer roll axis in FIGURE 16 senses the acceleration of the system in the east and west directions. The accelerometers are of the pendulous gyro integrating type, including laterally unbalanced gyros as shown, and may be of the type shown in a copending application of Vernon H. Aske and Arthur D. Glick entitled "Control Apparatus," Serial No. 774,952, filed November 19, 1958, now Patent Number 3,041,883, and assigned to the same assignee as the present application. Generally, each of the accelerometers 70 and 71 comprises a gyro spin motor (M) having a rotor element adapted to rotate about a spin reference axis (SRA). The spin motor is mounted on a gimbal which is supported for rotation relative to its case or housing about an output axis (OA) which is perpendicular to the SRA. The gimbal is made pendulous in such a direction about OA that is responds to accelerations along the acceleration sensitive axis (ASA) which is perpendicular to both the SRA and the OA. The ASA also corresponds to the gyro input axis (IA). As is well known, rotation of the gyro about its IA causes precession of the gimbal about its OA. Associated with the gimbal are torquer or torque motor means (TM) adapted when energized to rotate the gimbal about the OA and signal generating or error pickoff means (EPO) adapted to measure rotation of the gimbal relative to its case or housing about its OA. The accelerometer case or housing is mounted on a platform which in turn is rotatably mounted on a base means for rotation relative thereto about an axis which is either aligned with or parallel to the ASA (and the IA) when the gyro gimbal is in its normal position. Associated with the platform are servo means or torque motor means (ATM) adapted when energized to rotate the platform relative to its support or base means and platform pickoff means (AEPO) adapted to measure angular displacement of the platform relative to its support or base means.

The gyro gimbal is a torque summing device. Torques on the gimbal arise from accelerations applied along the ASA, from the TM being energized, or from gyroscopic precession caused by the ATM rotating the platform about the axis IA. Generally the accelerometers 70 and 71 function in the following manner: the gimbal is rotated relative to its case due to an applied acceleration (or due to the TM being energized); the rotation is sensed by the EPO and the signal therefrom is applied after being amplified to the ATM; the ATM rotates the platform with the gyro thereon so that the resulting rotor precession tends to bring the gimbal back to its initial or null position. The rate of platform rotation is indicative of the applied acceleration (or the magnitude of the signal to the TM) and the total platform angular displacement is indicative of the integral of acceleration which is velocity (or the time integral of the signal to the TM).

Figure 2:
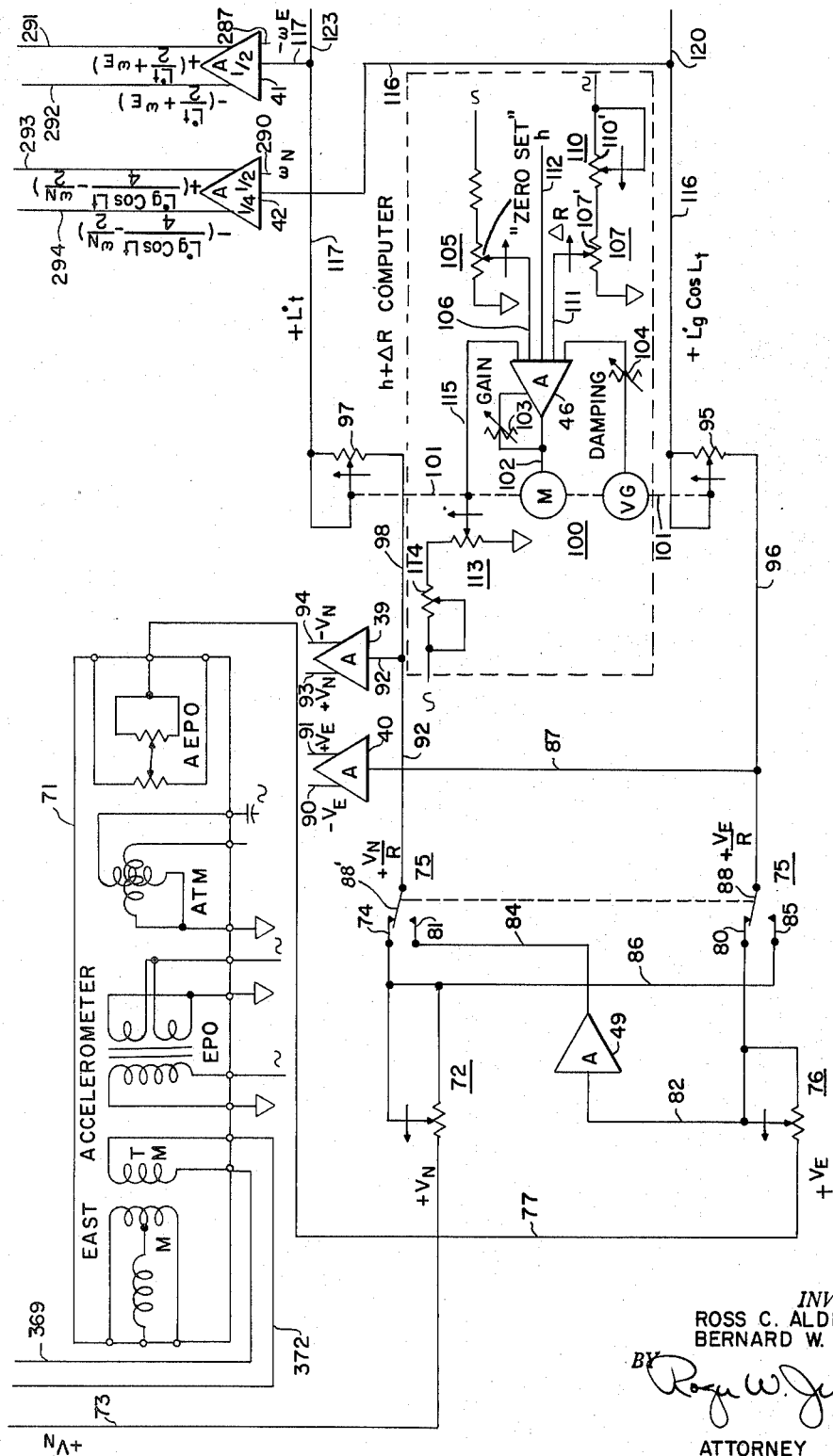

Referring specifically to FIGURES 1 and 2, it will then be noted that the North velocity signal $V_N$ is sent from the AEPO of accelerometer 70 to a scaling or signal modifying potentiometer 72 through a connecting lead 73. Scaling potentiometer 72 has one end of its resistive element connected to connecting lead 73, and the other end is connencted to the potentiometer wiper arm and to a relay contact 74 of a relay 75. The actuating coil for relay 75 is designated 75K and is shown and explained along with its connections in conjunction with FIGURE 9. In like manner, accelerometer error pickoff AEPO of east accelerometer 71 provides an output signal representative of east velocity $V_E$ which is applied to a scaling or signal modifying potentiometer 76 through a connecting lead 77. One end of a resistive element of potentiometer 76 is connected to connecting lead 77 and the other end is connected to the potentiometer wiper arm and to a relay contact 80 of relay 75. For purposes that will be discussed later, scaling potentiometer 76 has its wiper arm connected to a relay contact 81 of relay 75 through a connecting lead 82, an amplifier 49, and a connecting lead 84, and the wiper arm of potentiometer 72 is connected to a relay contact 85 of relay 75 through a lead 86. Relay 75 comprises a pair of switch arms 88 and 88' respectively normally in contact with contacts 80 and 74 as shown in FIGURE 2 and respectively normally out of contact with contacts 85 and 81. Potentiometers 72 and 76 are adjusted so that the voltages which represent the linear North and East velocities of the craft $V_N$ and $V_E$, are scaled or modified to represent the velocities divided by the radius of the earth R, assuming a spherical earth. In other words, angular velocities are derived. Therefore the voltage which appears on relay switch arm 88' represents the north velocity divided by the earth's radius or the North angular velocity $V_N/R$ and the voltage which appears on switch arm 88 of relay 75 is representative of the east velocity divided by the radius of the earth or the East angular velocity $V_E/R$. These voltages scaled or modified to represent the angular velocities east and north, are used in the Coriolis correction section of the computer which will be described later. In this connection, a suitable operational amplifier 40 is connected to switch arm 88 of relay 75 through a lead 87. Operational amplifier 40 is an amplifier that amplifies, or multiplies, the input signal, by methods well known in the art, by an electrical signal equivalent to R. When switch arm 88 engages contact 80, then the East angular velocity signal $V_E/R$ is applied to amplifier 40. The amplifier has a pair of output leads 90 and 91 having signals indicative respectively of $-V_E$ and $+V_E$. In like manner, an operational amplifier 39 is connected to armature 88' to receive an input signal representative of north angular velocity of the craft through a connecting lead 92 and information appears on a pair of output leads 93 and 94 as signals indicative respectively of $+V_N$ and $-V_N$. The North angular velocity signal $V_E/R$ may also be considered as an uncorrected signal indicative of rate of change of latitude or latitude rate ($\dot{L}_t$). In the same number, the East angular velocity signal $V_E/R$ may be considered as an uncorrected signal indicative of rate of change of longitude multiplied by the cosine of the latitude ($\dot{L}_g \cos L_t$). It will be understood that the longitude rate ($\dot{L}_g$) is calculated by the equation $$\dot{L}_g = \frac{V_E}{R \cos L_t}$$

By rearrangement of terms, it follows that $$\dot{L}_g \cos L_t = \frac{V_E}{R}$$

Figure 3:
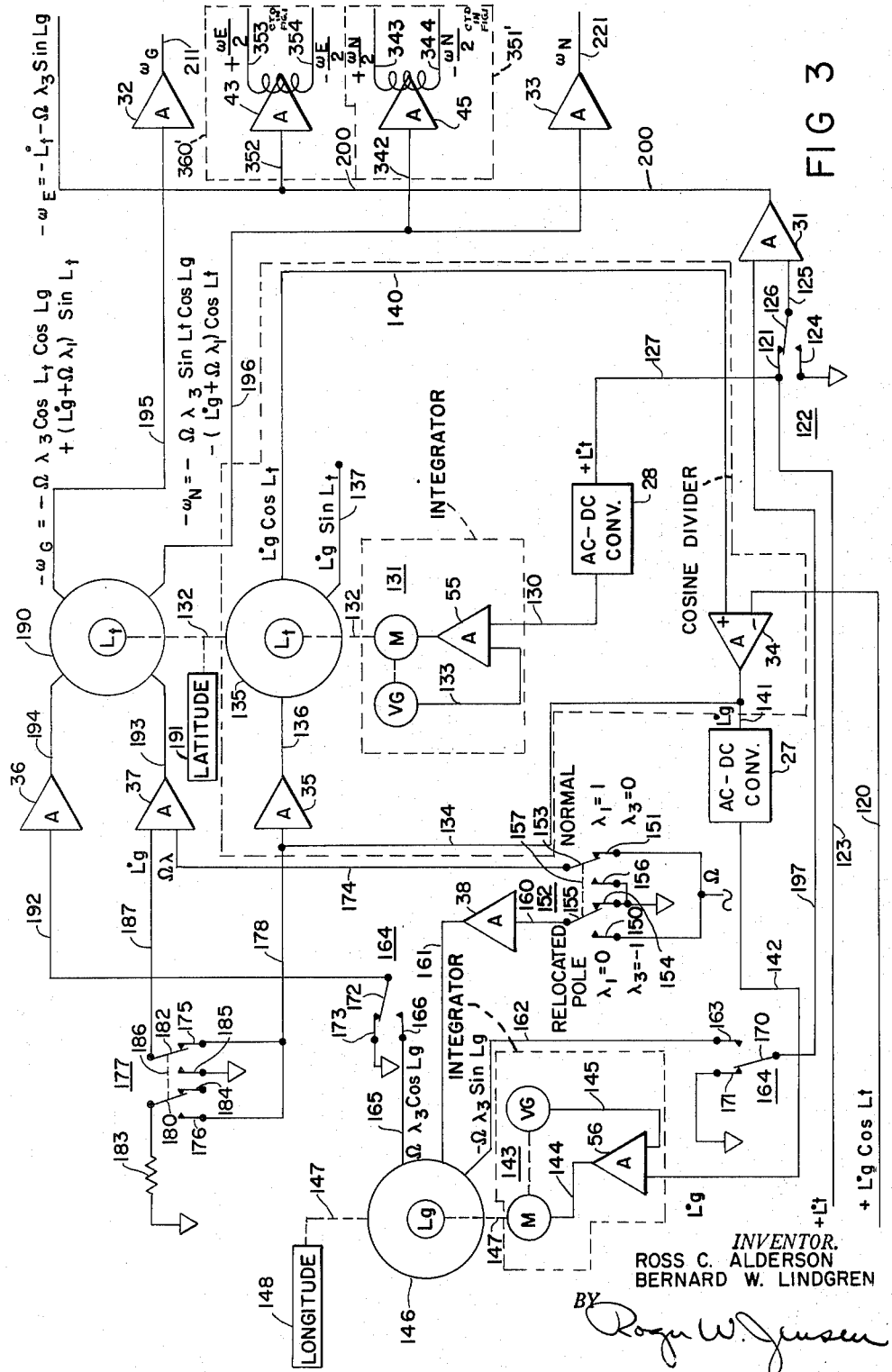

The $V_N/R$ and $V_E/R$ signals are, as signals indicative of $\dot{L}_t$ and $\dot{L}_g \cos L_t$ respectively, uncorrected for errors introduced by variations $\Delta R$ in the radius of the earth and by the altitude $h$ of the dirigible craft on which the inertial apparatus is mounted. Means described immediately below correct the signals for those factors ($\Delta R$ and $H$). A potentiometer 95 has one end of a resistive element connected to relay switch arm 88 by a connecting lead 96 and a potentiometer 97 has one end of a resistive element connected to relay switch arm 88' by a connecting lead 98 and previously mentioned lead 92. Potentiometers 95 and 97 have their wiper arms connected to the other end of their respective resistive elements. The wiper arms are driven by a motor generator 100 which has a motor and velocity generator connected by a common shaft 101. The motor is driven through an amplifier 46 which is connected to the motor of motor generator 100 through a connecting lead 102. A variable resistance 103 is connected in parallel between the motor and amplifier 46 to provide a gain adjustment. The motor is also damped as a result of the output voltage from the velocity generator being varied by a variable resistor 104 which is placed in series between the velocity generator and amplifier 46. A "zero set" potentiometer 105 connected between amplifier 46 and a suitable source of energization is a calibration potentiometer adjusted so that with no input to the amplifier 46, the servo system controlled thereby is not actuated. The wiper arm of potentiometer 105 is connected to amplifier 46 through a connecting lead 106 and one end of the resistive element of potentiometer 105 is grounded while the other end is excited by an alternating voltage. The alternating voltages used within the system are selected so that they are either in phase with respect to a reference voltage or will be 180° out of phase displacement with respect to the reference voltage. Another potentiometer 107 has its resistive element 107' connected between ground and one end of a resistive element 110' of a variable resistor 110. Variable resistor 110 has its wiper arm connected to the other end of the resistive element 110' which also is excited by a suitable alternating voltage. Resistor 110 is a calibration resistor for determining the proper scale factor. Potentiometer 107 is set to a value of voltage corresponding to $\Delta R$ which is defined as the average change in radius of the earth as determined by the average latitude of the craft and this voltage is sent to amplifier 46 through a connecting lead 111. A signal representative of altitude $h$ of the dirigible craft on which the inertial apparatus is mounted is presented as an input to amplifier 46 through a connecting lead 112. As the motor of the motor generator 100 drives the potentiometer wiper arms of potentiometers 95 and 97, another potentiometer 113 has its wiper arm adjusted by shaft 101 also. This potentiometer has one end of its resistive element connected to ground and the other end is connected to a variable resistor 114 which is excited by an alternating voltage source. Resistor 114 is used to adjust the proper scale factor of the voltage appearing across the resistive element of potentiometer 113 so that the voltage appearing on the wiper arm of potentiometer 113 may be used as a balance voltage which is sent to amplifier 46 through a connecting lead 115. Therefore, motor generator 100 and the wipers on potentiometers 95 and 97 are driven to a position representative of ($h+\Delta R$). It will be remembered that the signals applied to potentiometers 95 and 97 through leads 96 and 98 respectively are respectively indicative of uncorrected $\dot{L}_g \cos L_t$ and $\dot{L}_t$. By having the wipers of potentiometers 95 and 97 driven as a function of ($h+\Delta R$), the signal outputs of potentiometers 95 and 97 taken off at leads 116 and 117 respectively are indicative of corrected $\dot{L}_g \cos \dot{L}_t$ and corrected $\dot{L}_t$. Thus the potentiometers 72 and 97 together function as a north velocity divider to yield the geographical angular velocity $\dot{L}_t$, and the potentiometers 76 and 95 together function as an east velocity divider to yield the geographic angular velocity $\dot{L}_g$ times the cosine of $L_t$. The outputs of variable resistors 95 and 97 are sent to a pair of amplifiers 42 and 41 through a pair of connecting leads 116 and 117 respectively. The attenuation at amplifier 42 is ¼ and at amplifier 41 is ½. The outputs of these amplifiers will be described later. The quantity $\dot{L}_g \cos L_t$ is sent to an amplifier 34 (see FIGURE 3) from the wiper arm of potentiometer 95 through a connecting lead 120 and lead 116, and the quantity $\dot{L}_t$ is sent to a fixed contact 121 of a relay 122 from the wiper arm of potentiometer 97 through a connecting lead 123 and lead 117. The actuating coil for relay 122 is designated 122K and is shown and explained with its connections in conjunction with FIGURE 9. Relay 122 also contains another fixed contact 124 which is connected to ground. An amplifier 31 is connected to relay contact 121 through a connecting lead 125 and an armature 126 of relay 122, armature 126 as shown in FIGURE 3 normally engaging contact 121. The signal representative of latitude rate $\dot{L}_t$ which appears on relay contact 121 is sent to an A.C.-D.C. converter 28 through a connecting lead 127. The converter changes the signal from an alternating current to a direct current signal, and this signal is sent to an amplifier 55 through a connecting lead 130. Amplifier 55 and a motor generator 131 form an integrating device which integrates latitude rate signal $\dot{L}_t$ and the integral of this signal which is latitude $L_t$ is found in the form of a rotation of a shaft 132. The generator portion of motor generator 131 supplies a velocity feedback signal to amplifier 55 through a connecting lead 133 to provide a signal which balances the input angular velocity signal so that the output of the motor is an integral of the input signal.

Referring now to amplifier 34, it will be noted that the output from amplifier 34 is sent to an amplifier 35 through a connecting lead 134. Amplifier 35 serves as a buffer amplifier and the signal is amplified and sent to a resolver 135 through a connecting lead 136. The resolver may be of the type shown in H. M. James Patent 2,715,274, dated August 16, 1955, except that the stator will consist of two windings in one plane and two windings in a plane at 90° to the first windings. Shaft 132, which is driven by motor generator 131, is connected to the rotor of resolver synchro 135 so that the resolver rotor is positioned at an angle representative of a given latitude. The output from resolver synchro 135 is, therefore, representative of the applied signal multiplied by the sine of latitude which appears as a signal on an output lead 137, and a second signal representative of the applied signal multiplied by the cosine of latitude that appears on a connecting lead 140 which is connected to amplifier 34 at its input. The amplifier 34 thus has two inputs, the first being lead 120 having a signal $\dot{L} \cos L_t$ and the second being lead 140 having a signal representative of the applied signal to resolver 135 multiplied by $\cos L_t$, the applied signal being the output of amplifier 34 as modified by the buffer amplifier 35. The net signal to the amplifier 34 is the difference between the two input signals. By having the gain of amplifier 34 quite high the output signal thereof is substantially equal to the first input signal ($\dot{L}_g \cos L_t$) divided by the cosine of the angle through which the resolver is rotated which in this case is the latitude $L_t$. Thus, the output of amplifier 34 is $$\frac{\dot{L}_g \cos L_t}{\cos L_t} \text{ or } \dot{L}_g \cdot \dot{L}_g$$

Thus, the cosine portion of the resolver 135 and the circuit including amplifiers 34 and 35 serve as a cosine divider.

The output $\dot{L}_g$ of amplifier 34 at lead 134 is also applied to an A.C. to D.C. converter 27 through a lead 141. Converter 27 changes the applied alternating current signal to a direct current signal which is applied to an amplifier 56 through a connecting lead 142. Amplifier 56 amplifies the direct current signal and supplies this signal as an input signal to a motor generator integrator 143 through a connecting lead 144. As the direct current signal is applied to amplifier 56, a rate signal is provided by the velocity generator of motor generator 143 and this signal is supplied to amplifier 56 through a connecting lead 145 to act as a balance signal to cause the motor generator to drive at a rate representative of the input signal $\dot{L}_g$ where the output is in the form of a shaft rotation which is the integral of the input signal. Another resolver synchro 146 has its rotor connected to the motor of motor generator 143 by a shaft 147 so that the rotor of resolver synchro 146 is positioned at an angle representative of the earth's longitude. A longitude counter or indicator or first signal transmitter 148 is driven by shaft 147 to display the longitudinal position of the craft.

A signal representative of earth rate $\Omega$ is applied to a pair of relay contacts 150 and 151 of a relay 152 (FIGURE 3). Relay 152 comprises a pair of ganged armatures or movable switch arms 153 and 155 shown respectively engaging fixed contacts 151 and 154 and out of engagement respectively with fixed contacts 156 and 150. The actuating coil for relay 152 is designated 152K and is shown and explained with its connections in conjunction with FIGURE 9. Armatures 155 and 153 are ganged by a link 157. The function of relay 152 is to change the mode of operation of the computer which will be briefly described at this time.

The present inertial system operates in a preselected local vertical coordinate system which in this preferred embodiment has axes aligned north, east and vertical. The platform is maintained aligned in this coordinate system by operation of three gyros 231, 242, and 247, the operation of which is explained in more detail in conjunction with the circuitry, and the computer which directs the proper electrical signals to the torque motors of the gyros. It can be seen that if the dirigible craft containing the present inertial system were to travel over the earth's north pole the computer could not direct signals to the gyro torque motors which would maintain the platform aligned in the local vertical coordinate system since there is no direction except south at the north pole. Thus, to produce a system which is useful at all points about the earth, a different computational system must be utilized when the dirigible craft is to approach or pass over the north pole of the earth. This is accomplished by providing, mathematically, a computational pole which the computer may utilize as a reference from which to make its calculations.

The pole or the position on the earth at which the computer becomes unstable or inoperative is designated the computational pole. By knowing in advance the flight path of the dirigible craft the computational pole may be shifted to a position the craft will not pass over and, thus, the output of the computer will be continuous. In the present embodiment when relay 152 is in the position designated "normal" the computational pole is located at the earth's north pole and when relay 152 is in the position designated "relocated pole" the computer is modified to locate the computational pole at the intersection of the earth's equator and a great circle, or meridian, passing through the earth's north pole and the initial position of the inertial system. It should be noted that the computational pole could be relocated at any position desired, but the present position has been chosen for ease in mechanization. Also, for this particular location of the relocated pole no actual movement or reorientation of the platform is required when switching from the "normal" to the "relocated pole" mode of operation. However, it should be noted that a reorientation would probably occur during this switching process if the relocated pole were located somewhere else.

As is well known in the art, any point on the surface of a sphere may be defined utilizing direction cosines. Therefore, the computational pole, whether normal or relocated, is defined in terms of direction cosines, which are represented by electrical signals in the computer. The electrical signals are utilizing by the computer in determining the various corrections to be applied to the torque motors of the gyros and the position outputs of the computer. The mathematical values of the direction cosines of the computational pole may be arrived at by assuming the earth is a unit sphere and a Cartesian coordinate system has its origin at the center of the earth with one axis lying along the polar axis of the earth and the other two axes lying at right angles in a plane containing the equator of the earth one of them in the meridian plane of the initial position of the inertial system. When relay 152 is in the "normal" position, the first direction cosine, $\lambda_1$, is equal to one and the second direction cosine, $\lambda_3$, is equal to zero (the third direction cosine, $\lambda_2$, is always equal to zero and will be ignored), the computational pole is located at the earth's north pole. When relay 152 is in the "relocated pole" position the first direction cosine, $\lambda_1$, is equal to zero and the second direction cosine, $\lambda_3$, is equal to a minus one. Thus the computational pole is located at the intersection of the earth's equator and a great circle passing through the earth's north pole and the initial position of the inertial system. It should be noted that the computational pole is strictly mathematical and the relocation is utilized simply to provide accurate computations of the computer when the inertial system is in the area of the earth's north pole.

When relay 152 is in the "normal" position the signal appearing on armature 153 will be representative of $\Omega\lambda_1$ and when relay 152 is in the "relocated pole" position the signal appearing on armature 155 will be representative of $\Omega\lambda_3$.

Referring first of all to the armatures of relay 152 in the relocated pole mode, it can be seen that the signal $\Omega\lambda_3$ is sent to an amplifier 38 through a connecting lead 160 where the signal is amplified and sent to resolver 146 on a connecting lead 161. Resolver 146 resolves the signal representative of $-\Omega\lambda_3$ into a pair of components emerging as signals representative of $-\Omega\lambda_3 \sin L_g$, that appears on a connecting lead 162 which is connected to a fixed relay contact 163 of a relay 164, and a second signal representative of $-\Omega\lambda_3 \cos L_g$ that appears on a connecting lead 165 which is connected to a fixed relay contact 166 of another section of relay 164. The first and second sections of relay 164 are separated in FIGURE 3 for convenience in drawing. Also the actuating coil of relay 164 is designated 164K and is shown and explained with its connections in conjunction with FIGURE 9. An armature 170 of the first section of relay 164 is connected to ground through a relay contact 171 and in like manner, an armature 172 of the second section of relay 164, is connected to ground through a contact 173. In the relocated pole mode of operation, armatures 170 and 172 are in contact with relay contacts 163 and 166 respectively.

In normal operation, which will now be considered, a signal representative of $\Omega\lambda_1$ which appears on relay armature 153, is sent to an amplifier 37 through a connecting lead 174. It will also be seen that the signal $\dot{L}_g$ which appears at the input to amplifier 35 is also connected to a pair of relay contacts 175 and 176 of a relay 177 through a connecting lead 178. Contact 176 is in an open position and contact 175 is in a closed position with respect to a pair of armatures 180 and 182. The actuating coil for relay 177 is designated 177K and is shown and explained with its connections in conjunction with FIGURE 9. Armature 180 is further connected to ground through a resistor 183 and is in contact with relay contact 184 which has no further connection, or, in other words, is in an open condition. Another relay contact 185 opposite relay contact 175 is connected to ground. Relay armatures 180 and 182 are ganged by a link 186. Therefore as shown in FIGURE 3, the only signal emerging from relay 177 is a signal representative of $\dot{L}_g$ which appears on armature 182 and this is applied to amplifier 37 through a connecting lead 187. Another synchro resolver 190 is connected to motor generator 131 by the common shaft 132 as is a latitude indicator or second signal transmitter 191 which displays the latitude position of the craft. An amplifier 36 is normally grounded at its input through a connecting lead 192, which is connected to armature 172 of relay 164 and relay contact 173. It will be noted that in the relocated pole mode of operation, armature 172 would supply the signal representative of $-\Omega\lambda_3 \cos L_g$ to amplifier 36. Thus, resolver 190 has impressed upon its input windings a pair of signals $\dot{L}_g + \Omega\lambda_1$, which appears on an output lead 193 that is connected between amplifier 37 and the input of resolver 190. Since amplifier 36 has its input at a ground potential, the output of amplifier 36 produces no signal on an output lead 194 thereof, which is connected to resolver 190. One of the outputs from resolver synchro 190 which appears on a first output lead 195 thereof is representative of the negative quantity $\omega_G$ where $\omega_G$ is the torque signal required to maintain the platform aligned in azimuth, or about the vertical axis of the azimuth, or about the vertical axis of the azimuth gyro. This signal is $-\Omega\lambda_3 \cos L_t \cos L_g + (\dot{L}_g + \Omega\lambda_1) \sin L_t$. It will be noted that the terms include both $\lambda_3$ and $\lambda_1$ so that regardless of which mode of operation is being engaged, the output signal will be of the proper quantity. Output connecting lead 195 is connected to an amplifier 32. Another or second output lead 196 of resolver 190 supplies an electric current representative of $-\omega_N$ which is representative of the rotational velocity of the platform about the north axis. The current is utilized to torque the north gyro 247 and consequently the platform so that the input axis to the east accelerometer 71 remains aligned with the east coordinate axis of the earth coordinate system. This current may be represented mathematically by $$-\Omega\lambda_3 \sin L_t \cos L_g - (\dot{L}_g + \Omega\lambda_1) \cos L_t$$

Connecting lead 196 is connected to an amplifier 33.

Turning now to amplifier 31, amplifier 31 may receive a signal from resolver synchro 146 through relay 164 if operated in the relocated pole mode of operation. In the relocated pole mode of operation, armature 170 engages relay contact 163 and supplies a signal representative of $-\Omega\lambda_3 \sin L_g$ to amplifier 31 through armature 170 and a connecting lead 197. The output of amplifier 31 is an electrical current representative of the quantity $-\omega_E$ which is representative of the rotational velocity of the platform about the east axis. The output of amplifier 31 is utilized to torque the east gyro 231 and consequently the platform so that the input axis to the north accelerometer 70 remains aligned along the north coordinate axis in the earth coordinate system. This current is $-\dot{L}_t - \Omega\lambda_3 \sin L_g$ which appears as an output signal from amplifier 31 on a connecting lead 200. Connecting lead 200 which contains the signal representative of $-\omega_E$ is connected to an A.C. to D.C. converter 22 (FIGURE 4) which is used to convert the alternating current signal to a direct current signal. Another input to converter 22 is obtained through a connecting lead 201 which is connected to an armature 202 of a relay 203. The actuating coil for relay 203 is designated 203K and is shown and explained with its connections in conjunction with FIGURE 9. A voltage divider 204 is supplied with an alternating voltage and a wiper arm 205 thereof is connected to a fixed contact 206 of relay 203 by a connecting lead 207. Another relay contact 210 is in an open position and receives a signal representative of negative north gyro drift rate $-\delta_N$ which will be discussed later. The voltage appearing on wiper arm 205 is representative of negative drift rate, designated as $\delta_E$ of the gyro the rotor of which is to be precessed by the signal from converter 22 being applied to the torque motor of the gyro. The gyro drift is compensated for in converter 22 by combining the drift signal with the input precession signal. An alternating current-to-direct current converter 23 is excited by the $\omega_G$ signal output from amplifier 32, this signal being applied to converter 23 through connecting lead 211. Another signal is applied to converter 23 from a voltage divider 212 which is excited by an alternating voltage, the signal being picked off by a wiper arm 213 which is connected to converter 23 through a lead 214. The signal is representative of the drift rate, $\delta_G$, of the gyro to which the signal from converter 23, is to be applied. There is another input to converter 23 which will appear on a connecting lead 215 when the proper relay contact of a relay 216 is engaged. The actuating coil for relay 216 is designated 216K and is shown and explained with its connections in conjunction with FIGURE 9. A pair of signals may be sent to a contact 218 of relay 216 from an armature 208 of a relay 219. Relay 219 has a pair of contacts 209 and 229. Contact 209 is shown engaged with armature 208, and contact 229 is in an open position. The actuating coil for relay 219 is designated 219K and is shown and explained with its connections in conjunction with FIGURE 9. Contact 209 generally has an external azimuth error signal, the origin of which will be explained more fully in conjunction with FIGURE 10, which may be fed to converter 23, whereas contact 229 is connected to a signal source representative of $V_N$ multiplied by an attenuation constant $k$. The operation of relays 216 and 219 will be further explained at a later time. Ordinarily, connecting lead 215 is connected to ground through an armature 217, and a contact 220 of relay 216. The external azimuth signal is used for certain phases of initial alignment.

Another converter 24 is excited by the $\omega_N$ signal from amplifier 33 through a connecting lead 221 to provide a precession signal. A voltage divider 223 is excited by an alternating voltage and a wiper arm 224 of voltage divider 223 picks off a voltage of the proper phase which will correct the gyro drift of the gyro to which the precession signals from converter 24 are to be applied. Wiper arm 224 is connected to a contact 225 of a relay 226 through a lead 227. The actuating coil for relay 226 is designated 226K and is shown and explained with its connections in conjunction with FIGURE 9. A signal, designated $\delta_N$, appears at converter 24 through connecting lead 222, and an armature 230 which engages relay contact 225 to provide the signal representative of drift rate for the north gyro.

The east gyro 231 is oriented with its input axis parallel to the east axis of the inertial platform and the particular gyro utilized is of the integrating type such as the gyro shown in the Jarosh Patent 2,752,791. A gyro such as an integrating gyro contains a gyro motor M, which is excited by a three-phase alternating voltage source and also contains an error pickoff EPO and a torque motor TM. Gyros such as this have the error pickoff and torque motor on a concentric shaft generally so that the output of the gyro may be detected by the error pickoff and the appropriate voltage used to position the platform in such a manner as to cause the error pickoff voltage to go to zero. The torque motor, therefore, is positioned such that it may precess the gyro rotor and thus cause the error pickoff to send an appropriate voltage to the platform gimbal servo system. During normal operation, the output from converter 22 is sent to the torque motor winding on gyro 231 through a pair of variable resistors 232 and 233. The resistive elements of variable resistors 232 and 233 are connected in series and the other end of resistor 232 is connected to converter 22 by a connecting lead 234 and the other end of variable resistor 233 is connected to a relay contact 235 of a relay 236. The actuating coil for relay 236 is designated 236K and is shown and explained with its connections in conjunction with FIGURE 9. An armature 237 of relay 236 engages relay contact 235 so that the precession signal is connected to armature 237, and through a connecting lead 241 and a resistor 240 to the torque motor of east gyro 231.

The azimuth gyro 242 is of the same type as gyro 231; however, it has its input axis oriented along the vertical or gravity axis of the platform. The torque motor of the azimuth gyro is connected to converter 23 through three resistors 243, 244 and 245 which are all connected in series, resistors 244 and 245 being of the variable resistor type, and the circuit is completed to the torque motor through a connecting lead 246 connected to resistor 245. The north gyro 247 is positioned on the inertial platform with its input axis aligned parallel with the north axis of the platform. The precession signal from converter 24 is sent to a pair of variable resistors 250 and 251 which are connected in series. Resistor 250 is connected to converter 24 by a connecting lead 252. A relay 253 has a contact 254 connected to variable resistor 251 and the circuit is completed through an armature 255 of relay 253 and a connecting lead 256 which is connected to one end of the north gyro torque motor TM. Opposite contact 254 is a contact 259 which is grounded. The actuating coil for relay 253 is designated 253K and is shown and explained with its connections in conjunction with FIGURE 9. The other end of the gyro torque motor is connected to ground through a relay contact 257 of relay 253 and a relay armature 260 which, in turn, is connected to the other end of the gyro torque motor by a connecting lead 261. Armatures 255 and 260 are ganged by a link 258. A connecting lead 262 is connected to the end of variable resistor 232 on the end which contains lead 234 so that a voltage representative of $-\omega_E$ is dropped across a pair of variable resistors 263 and 264 which are connected in series, and the output connected to relay contact 265 of relay 253. This switching arrangement is used during a particular mode of initial alignment for the stable platform. In like manner, a connecting lead 266 is connected to the end of variable resistor 250 which has connecting lead 252 attached and the voltage is dropped across a pair of variable resistors 267 and 270 which are connected in series where resistor 270 is further connected to relay contact 271 of relay 236. This circuit is also used during a particular mode of initial alignment.

Since the north accelerometer 70 and east accelerometer 71 require certain correction signals to subtract the various unwanted quantities detected by the accelerometer to obtain the actual acceleration, it will be necessary to subtract these quantities from the input signals produced by the two accelerometers. This may be accomplished in several ways and the correction signal generating means chosen to subtract these quantities will now be described.

FIGURE 1 has a transformer 272 which has a primary and secondary winding. The primary winding receives the signal representative of altitude rate, $\dot{h}$, or $V_G$ which is equivalent to the vertical rate of change of the craft. The altitude rate signal may be obtained from a pressure sensing device or any of the other varied altitude rate sensing devices. This signal is impressed across the transformer and emerges on the secondary winding which is connected to a potentiometer 273 that has a wiper arm connected to an amplifier 47 at its input through a connecting lead 274. Potentiometer 273 is a calibration curve potentiometer the resistance of which is characterized to vary with the slope of the altitude rate output as a function of altitude. The magnitude of the ouput rate voltage varies from one altitude rate instrument to another and consequently, this magnitude must be determined for the particular altitude controller to be used with the computer and by using this potentiometer, the proper voltage is inserted into the altitude rate loop. The secondary winding of transformer 272 has one terminal grounded in order to provide the proper phase relationship for the incoming signal. The gain of amplifier 47 is adjusted by a variable resistor 275 which is connected, in turn, with the output of amplifier 47, and the $V_G$ signal, representative of vertical rate, is sent to a motor generator 276 through a connecting lead 277. Motor generator 276 consists of a motor and velocity generator where the velocity generator is used to supply a damping or feedback signal to amplifier 47 through a variable resistor 280 and a connecting lead 281. Motor generator 276 is connected by a common shaft 283 which is also connected to several potentiometer wiper arms. A potentiometer 284 has its resistive element center-tapped to ground and is connected to an alternating voltage source on one end, and has the other end connected to a variable resistor 285 which has its other end connected to the alternating voltage source. Therefore, potentiometer 284 produces a balance voltage on its wiper arm, which is connected to shaft 283, and this balance voltage appears at the input of amplifier 47 through a connecting lead 286. This voltage is used to balance the input voltage received at amplifier 47 and thus cause the motor generator 276 to be driven through a particular angle of rotation and then remain fixed as long as the vertical rate signal does not change. Hence, the rotational position of shaft 283 is representative of the quantity $V_G$ or $\dot{h}$. Potentiometer 285 in the preceding balance circuit is used as a scale factor variable resistor to adjust the scale factor of the balance voltage.

Figure 14:
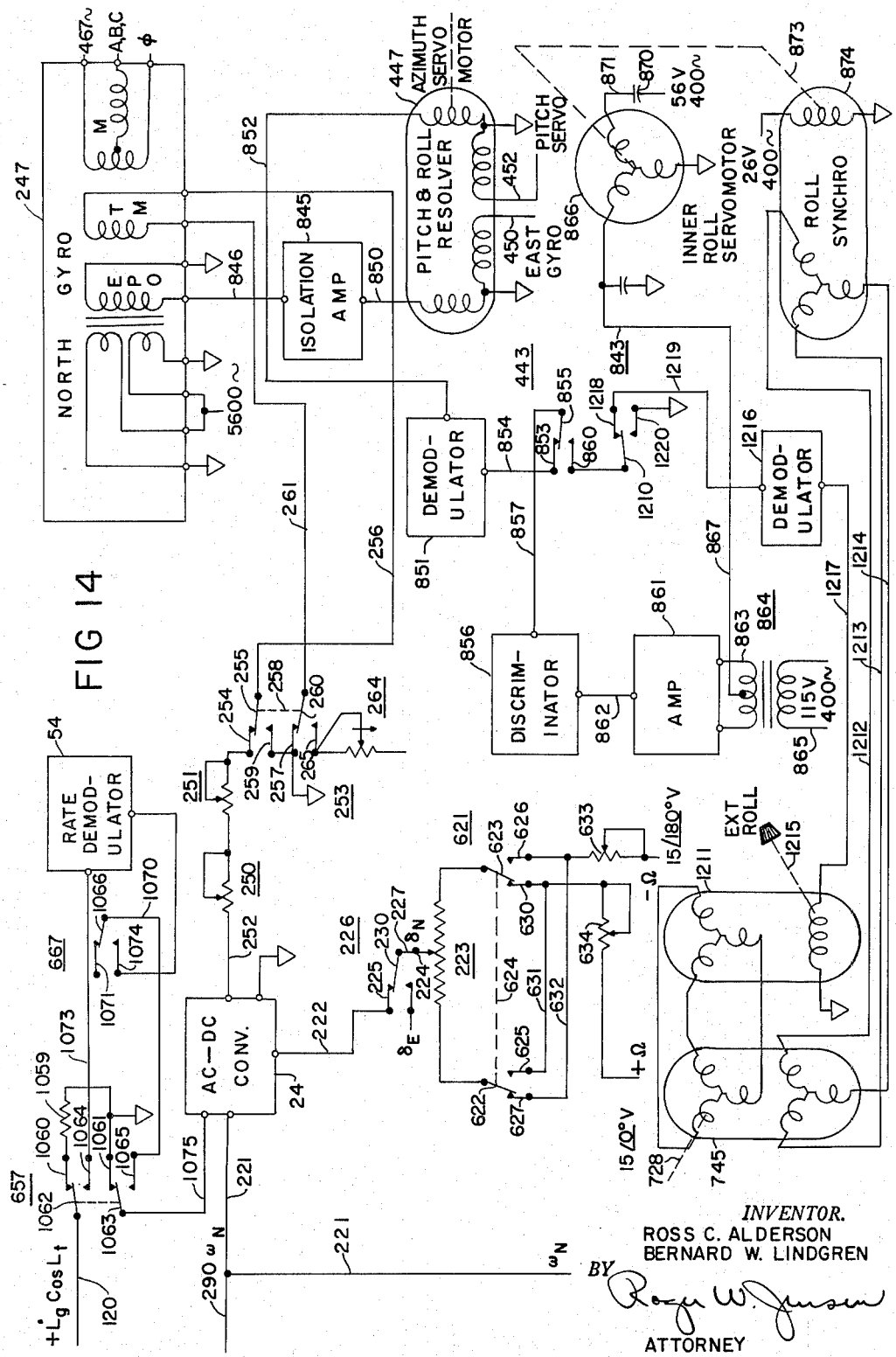
FIGURE 14 is a detailed schematic of the north gyro and its associated circuits and elements as contained on the stable platform.
Figure 15:
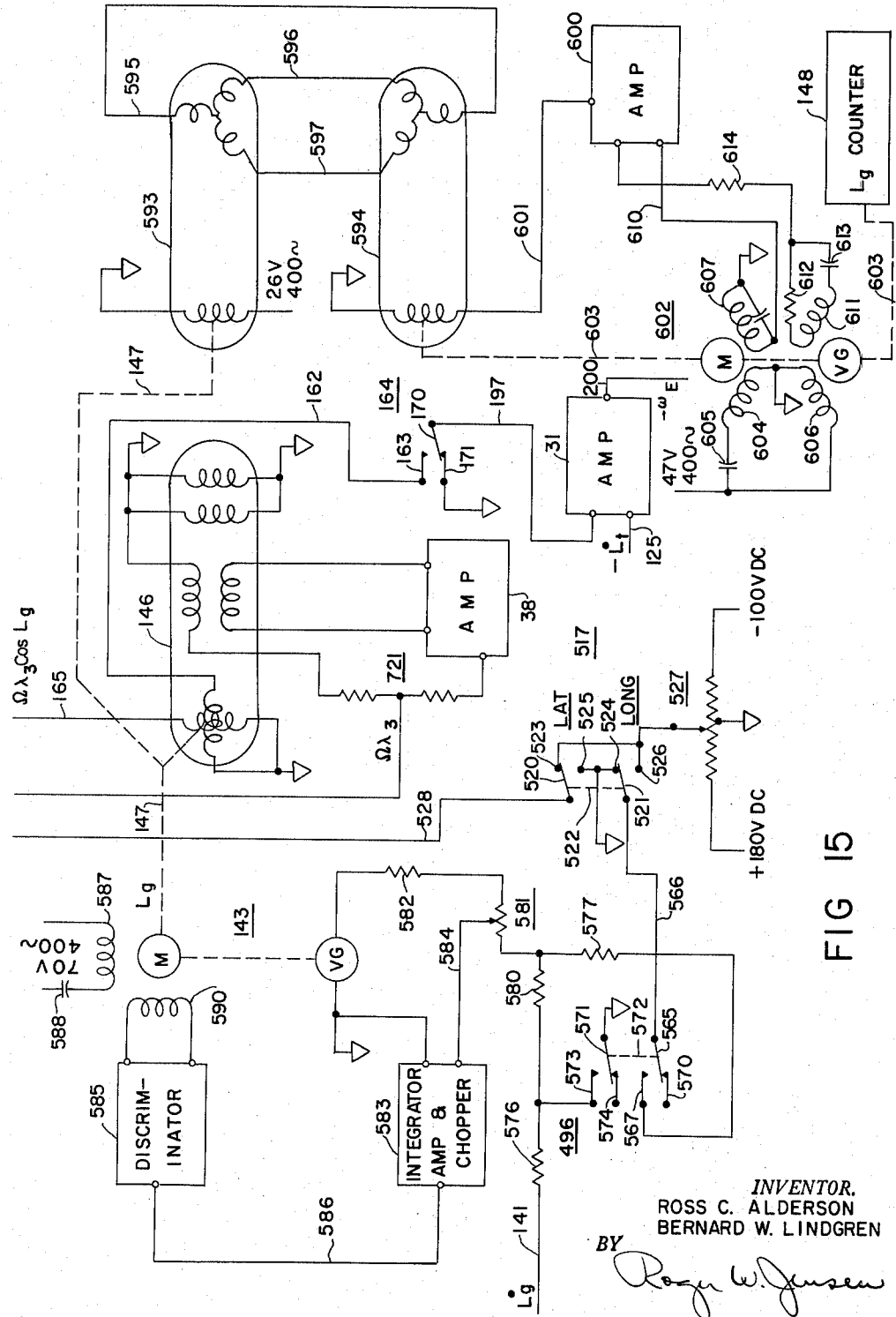
FIGURE 15 is a detailed schematic of the longitude display network and the longitude integrator and its associated circuits.

Since the quantities $-\omega_E$ and $\omega_N$ have been generated as just previously described, the $-\omega_E$ signal is introduced as an input to amplifier 41 with a gain of 1 (FIGURE 2) on a connecting lead 287 and the quantity $\omega_N$ is introduced to amplifier 42 with an attenuation of 1/2 through connecting leads 221 and 290 from amplifier 33 (FIGURES 3 and 14). These signals are added in the amplifiers by conventional impedance summing devices which are used with the amplifiers and converters of the system. By choosing the proper gain or attenuation, amplifier 41 produces a signal representative of $$\frac{+\dot{L}_t}{2} + \omega_E$$

or an output connecting lead 291 and produces a signal representative of $$\frac{-\dot{L}_t}{2} - \omega_E$$

on an output connecting lead 292. The gains are shown on the amplifiers opposite the inputs. In like manner, amplifier 42 produces an output signal representative of $$\frac{\dot{L}_g \cos L_t}{4} - \frac{\omega_N}{2}$$

on a connecting lead 293 and produces a signal representative of $$\frac{-\dot{L}_g \cos L_t}{4} + \frac{\omega_N}{2}$$

on a connecting lead 294. The signal representative of $$\frac{\dot{L}_t}{2} + \omega_E$$

which appears on connecting lead 291, is connected to a resistor 295 (FIGURE 1) which has its other end connected to the resistive element of a potentiometer 296. Resistive element 296 is center tapped to ground and has its other end connected to a variable resistor 297, which has its opposite end and wiper arm connected to connecting lead 292, which carries the signal $$\frac{-\dot{L}_t}{2} - \omega_E$$

Variable resistor 297 is used as a load balancing resistor to balance the load across potentiometer 296. The wiper arm of potentiometer 296 is connected to shaft 283 so that the information appearing on the wiper arm is multiplied by the information appearing on the shaft and this signal is representative of a quantity $$2V_G\left(\frac{\dot{L}_t}{2} + \omega_E\right)$$

which appears on the wiper arm of potentiometer 296 and is connected to an A.C.–D.C. converter 25 through a connecting lead 300. The signal representative of $$\frac{\dot{L}_g \cos L_t}{4} - \frac{\omega_N}{2}$$

is dropped across a resistor 301 which is further connected in series to a resistive element of a potentiometer 302 which is further connected to a variable resistor 303, and the circuit is completed by having the end of resistor 303 opposite the connection to potentiometer 302 connected to connecting lead 294. The wiper arm of resistor 303 is connected to the side of the resistive element opposite to that which is connected to the resistive element of potentiometer 302. The resistive element of potentiometer 302 is center tapped to ground and a wiper arm of potentiometer 302 is connected to an A.C.–D.C. converter 26 through a connecting lead 304. Variable resistor 303 is a load balancing resistor which is used to properly balance the load across the resistive element of potentiometer 302. Since the rotational angle of shaft 283 is representative of the vertical velocity $V_G$, by choosing the proper scale factors for the shaft rotation, signals emerging from potentiometer 302 will be representative of $$4V_G\left(\frac{\dot{L}_g \cos L_t}{4} - \frac{\omega_N}{2}\right)$$

An amplifier 48 receives a pair of input signals, $\omega_G$ on a connecting lead 211 and $L_g \sin L_t$ on a connecting lead 137. The input for $\omega_G$ has a gain of 2. Connecting lead 211 may be connected to any convenient point having a signal representative of $\omega_G$ such as the output of amplifier 32 and the quantity $L_g \sin L_t$ is obtainable from resolver synchro 135 on connecting lead 137. Thus amplifier 48 amplifies the pair of signals just described which are summed together in the amplifier so that a motor generator 307 may be driven to a position representative of $2\omega_G + L_g \sin L_t$. A variable resistor 311 is connected in parallel with the output of amplifier 48 to control the gain. The velocity generator of motor generator 307 produces an output signal which is of negative phase and is dropped across a variable resistor 312 which is used to regulate the feedback to amplifier 48 through a connecting lead 313. One terminal of an alternating voltage source is connected to one end of a potentiometer 314 and the other end of the resistive element is connected to a variable resistor 315, which, in turn, is connected to the other terminal of the alternating voltage source. The resistive element of potentiometer 314 is center tapped to ground and a wiper arm is electrically connected to amplifier 48 through a connecting lead 316. Variable resistor 315 is used as a scale factor potentiometer to provide the proper scale factor for balancing the input signals to amplifier 48 and thus determine the proper amount of rotation required of a shaft 317, which is connected to motor generator 307. Shaft 317 is connected to the wiper arm of potentiometer 314 such that the rotation of shaft 317 is representative of the quantity $2\omega_G + L_g \sin L_t$.

The $-V_E$ signal present on connecting lead 90 which is one of hte outputs of amplifier 40, is connected to one side of a resistive element of a potentiometer 320 through a resistor 321. The resistive element of potentiometer 320 is center tapped to ground and has the end opposite that just described connected to a variable resistor 322 which has its other end and wiper arm connected to connecting lead 91 which carries the $+V_E$ signal. Variable resistor 322 is used as a scale factor device for determining the scale factor which will appear at the wiper arm of potentiometer 320. The wiper arm of potentiometer 320 is connected to shaft 317 so that the electrical output of the wiper arm is equal to the quantity $$V_E(2\omega_G + L_g \sin L_t)$$

which appears as a signal on a connecting lead 323 which is connected to converter 25. The $+V_N$ signal is obtained from amplifier 39 on connecting lead 93 and is dropped across a variable resistor 324 which also has its wiper arm connected to connecting lead 93 and the other end of the resistive element is connected to a resistive element of a potentiometer 325 which is center tapped to ground. The other end of the resistive element is connected to a dropping resistor 326 which, in turn, is connected to lead 94 carrying the $-V_N$ signal. The variable resistor 324 is also used as a scale factor adjusting resistor to produce the proper output signal on the wiper arm of potentiometer 325 which is also connected to shaft 317. Therefore, the output of the wiper arm of potentiometer 325 represents the quantity $V_N(2\omega_G + L_g \sin L_t)$ which is carried to converter 26 through a connecting lead 327. For certain initial alignment, a signal of $-V_N$ is fed to converter 25 through a connecting lead 330, a relay contact 334, and an armature 331 of a first section of a relay 332. The actuating coil for relay 332 is designated 332K and is shown and explained with its connections in conjunction with FIGURE 9. Relay 332 has two sections which are shown separated in FIGURE 1 to simplify the schematic. A relay contact 333 of the first section of relay 322 is normally closed with the $-V_N$ signal being impressed upon the contact. Converter 26, in like fashion, has a connecting lead 335 connected to a contact 340 of the second section of relay 332. The second section of relay 332 has another contact 341 and an armature 336 which are normally engaged and connected to the $-V_E$ signal.

Figure 5:
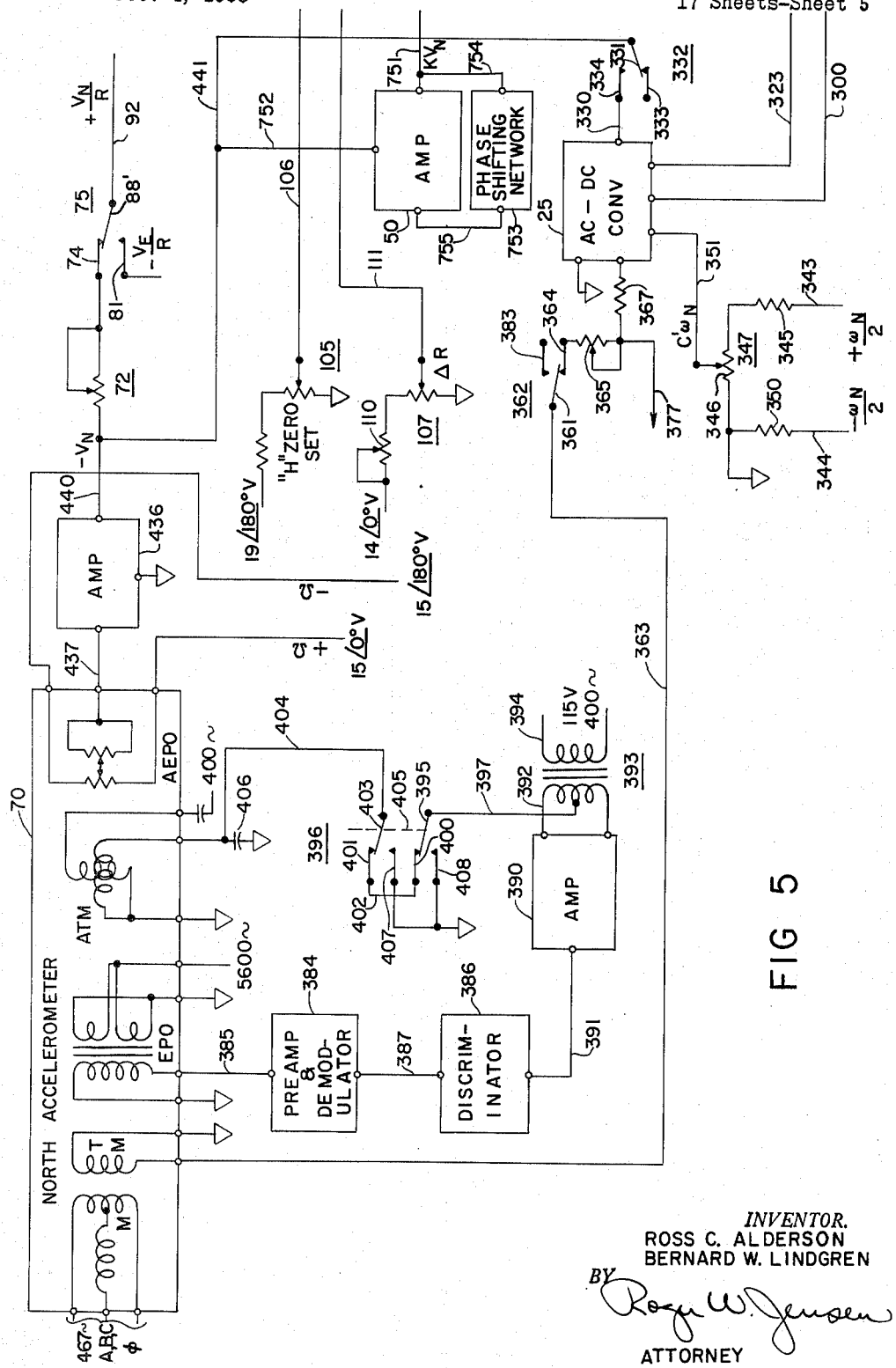
FIGURE 5 is a detailed drawing of the circuits associated with the north accelerometers.
Figure 6:
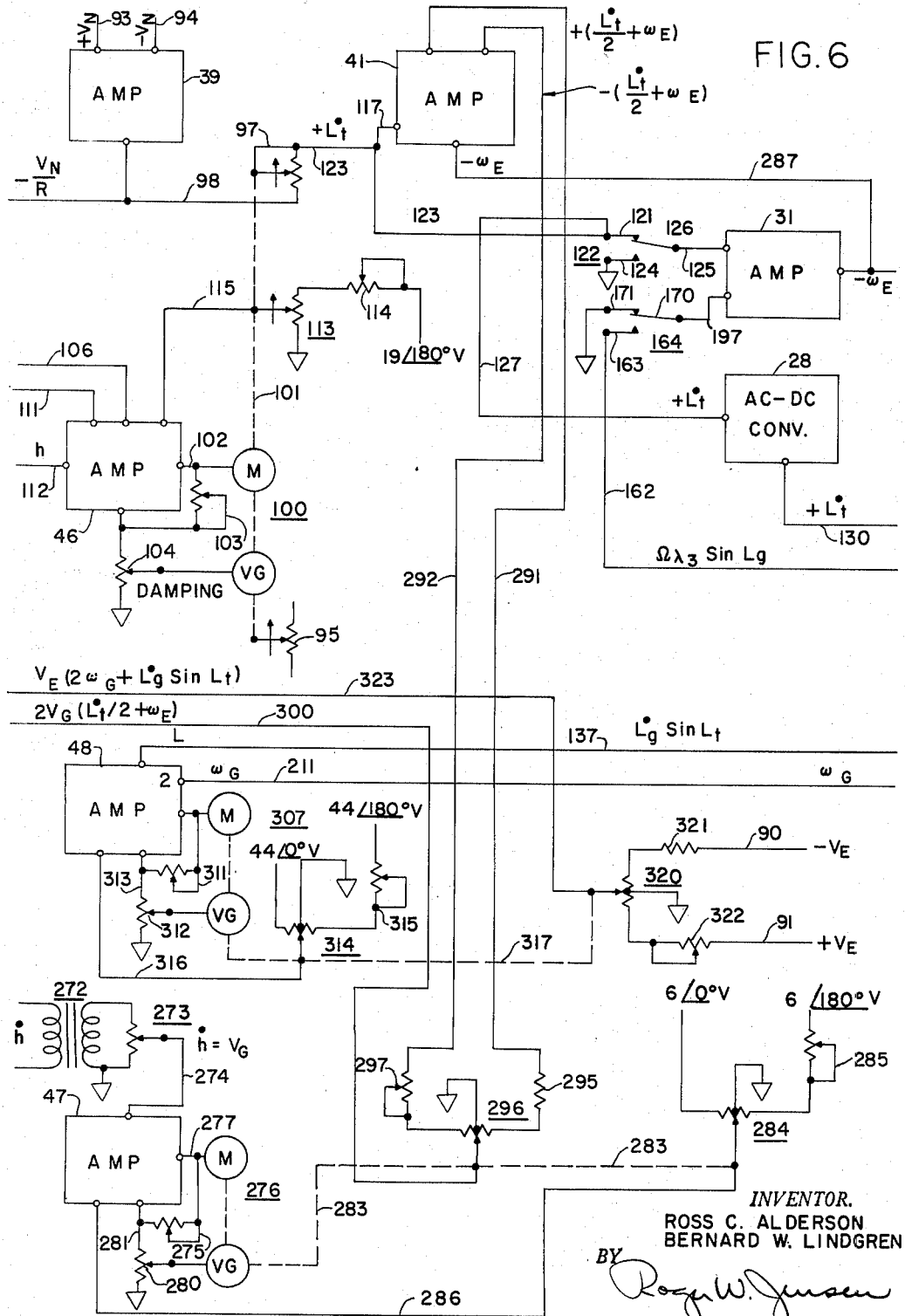
FIGURE 6 is a detailed drawing of the altitude, vertical rate, and east velocity multiplying servos as associated with the latitude loop circuits.

Due to the fact that a pendulous integrating accelerometer is used on the platform, it also becomes necessary to compensate the accelerometers for the effect of platform rotation on the accelerometer gyro. This compensation is required because the accelerometer will sense an apparent acceleration unless the correction signal is used. The quantity required to correct the north accelerometer is obtained from a correction signal generator 351', shown partly in FIGURE 1 and partly in FIGURE 3, by taking an output of $-\omega_N$ from connecting lead 196 and supplying this signal to an amplifier 45 through a connecting lead 342, so that the output of amplifier 45 supplies a signal representative of $+\omega_N/2$ on an output lead 343 and a signal representative of $-\omega_N/2$ on an output lead 344. Referring to FIGURE 1 or 5, output lead 343 is connected to one side of a resistor 345 and output lead 344 is connected to one side of a resistor 350. The other ends of resistors 345 and 350 are connected, respectively, to the ends of a resistive element 346 of a potentiometer 347. The junction of resistor 350 and the resistive element of 347 is connected to ground to furnish a return path for the electrical signal and a wiper arm of potentiometer 347 is connected to converter 25 through a connecting lead 351 so that the signal received in converter 25 is representative of $C'\omega_N$. In like manner, the quantity required to correct the east accelerometer is obtained from a correction signal generator 360' shown partly in FIGURE 1 and partly in FIGURE 3. The $-\omega_E$ signal is sent to an amplifier 43 through a connecting lead 352 which is connected to lead 200. The output of amplifier 43 provides a signal representative of $+\omega_E/2$ on an output lead 353 and provides a signal representative of $-\omega_E/2$ on an output lead 354. Connecting lead 354 is connected to a resistor 355 in FIGURE 1, which, in turn, is connected to a resistive element of potentiometer 356 and the other end of the resistive element is connected to ground. Connecting lead 353 is connected to ground through a resistor 357. Therefore, the voltage which appears on the wiper arm of potentiometer 356 is supplied to converter 26 through a connecting lead 360 and is representative of the quantity of $C'\omega_E$ which is the voltage required to compensate for the effect of rotation of the platform on the east accelerometer gyro.

The correction terms developed in the corrective signal generator as just described are then sent to the torque motors on the two accelerometers. This is done by connecting the torque motor of accelerometer 70 to ground on one end and to a relay armature 361 of a relay 362 through a connecting lead 363. The actuating coil for relay 362 is designated 362K and is shown and explained with its connections in conjunction with FIGURE 9. Armature 361 engages relay contact 364 which is connected to a variable resistor 365 by a connecting lead 366. A wiper arm of variable resistor 365 is connected to the end of the resistive element opposite the relay contact. The wiper arm is further connected to a resistor 367, which is connected to the output of converter 25. Converter 25 has the circuit completed by being connected to ground. Variable resistor 365 is used to adjust the voltage for the proper scale factor to wipe out the apparent accelerations caused by the centripetal force and the Coriolis force as well as the effect of rotation of the platform on the pendulous accelerometer as just described. In like manner, one end of the torque motor winding of east accelerometer 71 is connected to an armature 368 of a relay 371 through a connecting lead 372 and the other end of the torque winding is connected to an armature 370 of relay 371 through a connecting lead 369. Armature 368 engages a contact 373 which is connected to one end of a variable resistor 374, and armature 370 engages a contact 379 which is connected to ground. Relay contact 378 opposite contact 373 is also connected to ground. The actuating coil for relay 371 is designated 371K and is shown and explained with its connections in conjunction with FIGURE 9. The other end of variable resistor 374 is connected to its wiper arm and the wiper arm in turn is connected to the output of converter 26 through a resistor 375. Converter 26 has the circuit completed to the torque motor through a ground connection.

For certain alignment operations, it may be necessary to cause the signal sent to the north accelerometer 70 to be sent to the east accelerometer 71 and vice-versa. Therefore, as shown in FIGURE 1, the correction signal from converter 25 is sent to a relay contact 376 of relay 371 through a connecting lead 377, which is connected to the wiper arm of variable resistor 365, and a variable resistor 380 which is connected to relay contact 376. The wiper arm of variable resistor 380 is connected to the resistive element where connecting lead 377 is connected. In like manner, the correction signal for the east accelerometer may be sent to the north accelerometer 70 from converter 26 through a connecting lead 381 which is connected to the wiper arm of variable resistor 374, and a variable resistor 382 which is further connected to a relay contact 383 of relay 362. Variable resistor 382 has the wiper arm connected to connecting lead 381. Variable resistors 380 and 382 serve the same purpose as variable resistors 365 and 374. However, the operation in this mode will not be discussed at this time.

From FIGURES 1, 2, 3 and 4 it may be seen that voltages representative of the velocity of the craft are received from the integrating accelerometer where they are scaled to represent the velocity divided by the radius of the earth and later the altitude of the craft is added to correct the radius quantity since the craft will generally be above the surface of the earth. These signals are then treated properly so as to represent latitude and longitude rates which may be integrated to give a position of latitude and longitude from a given or starting position. Further, precession signals are generated which include terms to correct the gyros for the rotation of the earth and in accordance with the particular mode of op-

17 eration, and these signals are used to precess the rotors of the gyroscopes on the inertial platform which includes the rotors of the accelerometers. The gyros 231, 242 and 247 then produce an output signal which is fed to the gimbal system which supports, or constitutes the platform, to eliminate the precession signal by rotating the platform. A more detailed description of the semi-schematic representation of FIGURES 1, 2, 3 and 4 will now be given and the alignment operation of the system will be enlarged upon.

*Operation and further structural detail*

As noted below FIGURES 5 through 15 include more structural detail, which will be described in connection with the detailed operation of the system. Referring to FIGURE 5, it will be seen that the error pickoff EPO of north acelerometer 70 sends the signal from the error pickoff to a preamplifier and demodulator 384 through a connecting lead 385. The signal is sent from the preamplifier and demodulator 384 to a discriminator 386 through a connecting lead 387. The signal from the discriminator 386 is amplified by an amplifier 390 after receiving the signal through a connecting lead 391. The output of amplifier 390 is connected to a secondary winding 392 of a transformer 393. A primary winding 394 of transformer 393 is excited by an alternating voltage source of 115 v., 400 c.p.s. The signal emerges on a center tap of secondary winding 392 and is sent to an armature 395 of a relay 396 through a connecting lead 397. Relay 396 has a contact 400 which is engaged by armature 395 and this contact is connected to a second relay contact 401 by a connecting lead 402. Contact 401 is engaged by a second armature 403 and the armature is connected to a winding of the accelerometer servo motor or torque motor ATM, by a connecting lead 404. Armatures 403 and 395 are connected by a common link 405. The actuating coil for relay 396 is designated 396K and is shown and explained with its connections in conjunction with FIGURE 9. A capacitor 406 is connected between lead 404 and ground to provide a resonant circuit with the winding just mentioned. The circuit is completed by having the other end of the accelerometer torque motor connected to ground and a second winding of the accelerometer torque motor connected to a 400 c.p.s. supply through a phase shifting capacitor. Relay 396 also has a pair of contacts 407 and 408 which are normally in the open position with respect to armatures 403 and 395 and these contacts are connected to ground. This structure and operation can probably best be described by referring to the relay switching schematic which is shown in FIGURE 9.

A voltage produced by direct current and referenced to ground is present on a lead 410 and is connected to a double-pole single-throw switch 411 by a connecting lead 414 to a pair of switch arms 412 and 413 which are connected by a common link. Switch 411 is designated the Emeregency Off-On switch and is manually operable to remove power from the system in the event of a failure which cannot be corrected by other means. By closing this switch, voltage is placed on a switch arm 415 of switch 416. Switch 416 is designated as The Computer Power Supply switch and is manually operable to apply power to the various circuits through a relay 475, the operation of which is explained more fully later. Switch 416 is operated through its various steps prior to all other operations thereby insuring proper warm-up of all components. Voltage is also sent to a switch arm 417 of a switch 418 through a connecting lead 419. Switch 418 is designated as the Gyro Heater switch and is used to energize the heating circuits on the gyros which are not shown in the drawings. The voltage is then sent to a push button switch 420 which has a pair of contacts, one of which is connected to the switch contact of switch 418 normally engaged by switch blade 417, through a connecting lead 421, and the other contact is engaged by a push button 422 which normally engages both of the switch contacts. Switch 420 is of the type such that upon push button 422 being depressed, the circuit is open. Voltage is then present on the latter mentioned switch contact which is sent to a first switch contact of of switch 423 through a connecting lead 424. Switch 423 has a push button 425 which is normally open and when depressed engages a second switch contact to complete the closing of the switch. Switch 420 is designated as the Platform Power Off switch and switch 423 is designated as the Platform Power On switch.

In the normal procedure for applying power to the system, switch 411 is in the closed position, that is switch arms 412 and 413 are in contact with switch arm 415 and lead 419 respectively, switch 416 is in step 1, switch 418 is open, push button 422 is making contact, and push button 425 is not making contact, as illustrated. To begin operation switch 416 is stepped through its various positions. For the present disclosure the only position of importance is step 3. Thus, switch 416 can be moved to step 3 and then switch 418 is closed. A predetermined amount of time must be allowed for warm-up of the various components after which push button 425 may be depressed. Power is now applied to the system and the various alignment steps to follow will be explained in detail below.

*Standby mode*

Switch 423 is connected to a section 426B of a seven position switch 426 which has its terminals of each section designated hereafter by position as (a), (b), (c), (d), (e), (f), and (g) and is of the "make-before-break" type. Switch 426 has sections B, C, D, E, F and G shown at various places in FIGURE 9 and an additional section H can be seen in FIGURE 10. As seen by the legend designating the various positions of switch 426, the switch section 426B is shown in the Standby position, and has a wiper arm in contact with its terminal (a), which is connected to the second switch contact of switch 423, and to a relay coil 843k through a lead 429. The circuit is completed by connecting coil 843k to ground. Switch 426 is designated as the System Mode Selector switch and is made up of several sections which are all ganged. Upon the wiper arm making contact with terminal (a) and push button 425 being depressed, voltage is supplied to a relay coil 427k of a relay 427, through a connecting lead 428. Lead 428 is also connected to an armature 430 of relay 427 which engages a contact 431 which is normally open with nothing connected to the contact. Another contact 432 is connected to lead 424 by a connecting lead 433. Thus there is voltage present on contact 432 and as armature 430 becomes engaged with contact 432, the voltage to coil 427k is through a pair of paths, one of which is broken by the release of push button 425 of switch 423. However, the holding circuit through armature 430 and contact 432 applies a voltage to lead 428. A second portion of switch 426 is designated as 426C and has terminals (a), (b), (c), and (d) connected together by a common connector which in turn is connected to lead 428 by a connecting lead 434. By tying together the therminals just mentioned, a voltage will be provided on a wiper arm of switch 426C for the operating modes of Standby, Coarse Alignment, Gyro Spin, and Gyro Stabilization. The other modes of operation will be described later. The wiper arm of switch 426C furnishes voltage to a pair of relay coils 396k and 796k, through a connecting lead 435 and the circuit is completed by having the other ends of the coils connected to ground. The operation of relay 796 will be explained later. When coil 396k is energized, the energization of coil 396k will cause armatures 395 and 403 seen in FIGURE 5 to be engaged by contacts 408 and 407 respectively which are both connected to ground. The loop circuit between the gyro error pickoff contained in the north accelerometer, and the accelerometer torque motor, is connected to ground at both the input and output and therefore the signal received from the error pickoff EPO is not used at this time. As will be explained later the platform gimbal servos are disabled also in the STANDBY MODE of operation. Also shown in FIGURE 5 is an accelerometer error pickoff amplifier 436 which is connected to the accelerometer error pickoff by a connecting lead 437 and the amplified signal appears at the side of variable resistor 72 opposite the connection to relay 75, through a connecting lead 440. It may also be seen that variable resistor 72 and lead 440 are connected to armature 331 of relay 332 by a connecting lead 441. Referring to the switching circuit of FIGURE 9 again, switch 426 contains a section D which has a wiper arm or switch arm connected to terminal (a) of switch 426C through a connecting lead 442. Switch terminals (a), (b), and (c) of switch 426D are connected to a pair of relay coils, 443k and 943k of relays 443 and 943, respectively, through a connecting lead 444 and the circuit is completed by having the other end of coils 443k and 943k connected to ground. It may be seen that coil 443k is also actuated during the Standby mode of operation and the relay 443 is associated with a circuit of the latitude loop involving the east gyro 231 as shown in FIGURE 8.

During normal operation, the signal produced by the error pickoff of east gyro 231 is sent to an isolation amplifier 445 through a connecting lead 446 and the isolation amplifier supplies a signal to one of the stationary windings of a pitch and roll resolver synchro 447 through a connecting lead 450. Resolver 447 receives another input from the error pickoff of the north gyro and the signals represent the angle that the inertial platform has deviated from the reference as establishd by the gyros and this signal is resolved into a pair of components by having the rotor of the pitch and roll resolver synchro 447 rotated indirectly by an azimuth servo motor which will be described later. The pitch signal emerging from the pitch and roll resolver synchro 447 is sent to a demodulator 451 through a connecting lead 452. The demodulator supplies a direct current signal output which is connected to a relay contact 453 of relay 443 through a connecting lead 454. Relay contact 453 is engaged by an armature 455 which is connected to a discriminator 456 through a connecting lead 457. Relay 443 has another contact 460 opposite contact 453 which is connected to an armature 810 of relay 843. Discriminator 456 is connected to a discriminator amplifier 461 through a connecting lead 462 where the pitch signal is amplified and appears at a center tap of a secondary winding 463 of a transformer 464. A primary winding 465 of transformer 464 is excited by a 115 v. alternating voltage source. The center tap of secondary winding 463 is connected to a control winding of a pitch servo motor 466 through a connecting lead 467. Pitch servo motor 466 is excited by a 56 volt alternating voltage source through a capacitor 470 and a connecting lead 471. The circuits are completed by grounding the other leg of the pitch servo motor. A shaft 473 connects the rotor of pitch servo motor 466 to a rotor of a pitch synchro 474. The rotor winding is connected to ground on one end and to a 26 volt alternating source on the other end. An output is obtainable from pitch synchro 474 in the form of an electrical signal representative of the platform pitch angle.

The signal representative of the platform pitch angle is sent from pitch synchro 474 through the three connecting leads 812, 813, and 814 to a pitch synchro 811 which may be external of the platform. The rotor of external pitch synchro 811 is controlled through a shaft 815 which is positioned as by a manually operated knob in accordance with the pitch angle required to roughly align the pitch gimbal in a level attitude. The output from the rotor is sent to a demodulator 816 through a connecting lead 817 and the output of the demodulator is carried to a relay contact 818 of relay 843 through a connecting lead 819. Relay 843 has another contact 820 opposite contact 818 and connected to ground. Since relays 443 and 843 are both actuated during the Standby mode of operation, armature 455 engages contact 460 and armature 810 engages contact 820 so that pitch servomotor 466 has its input grounded and therefore the pitch servomotor is disabled.

Figure 8:
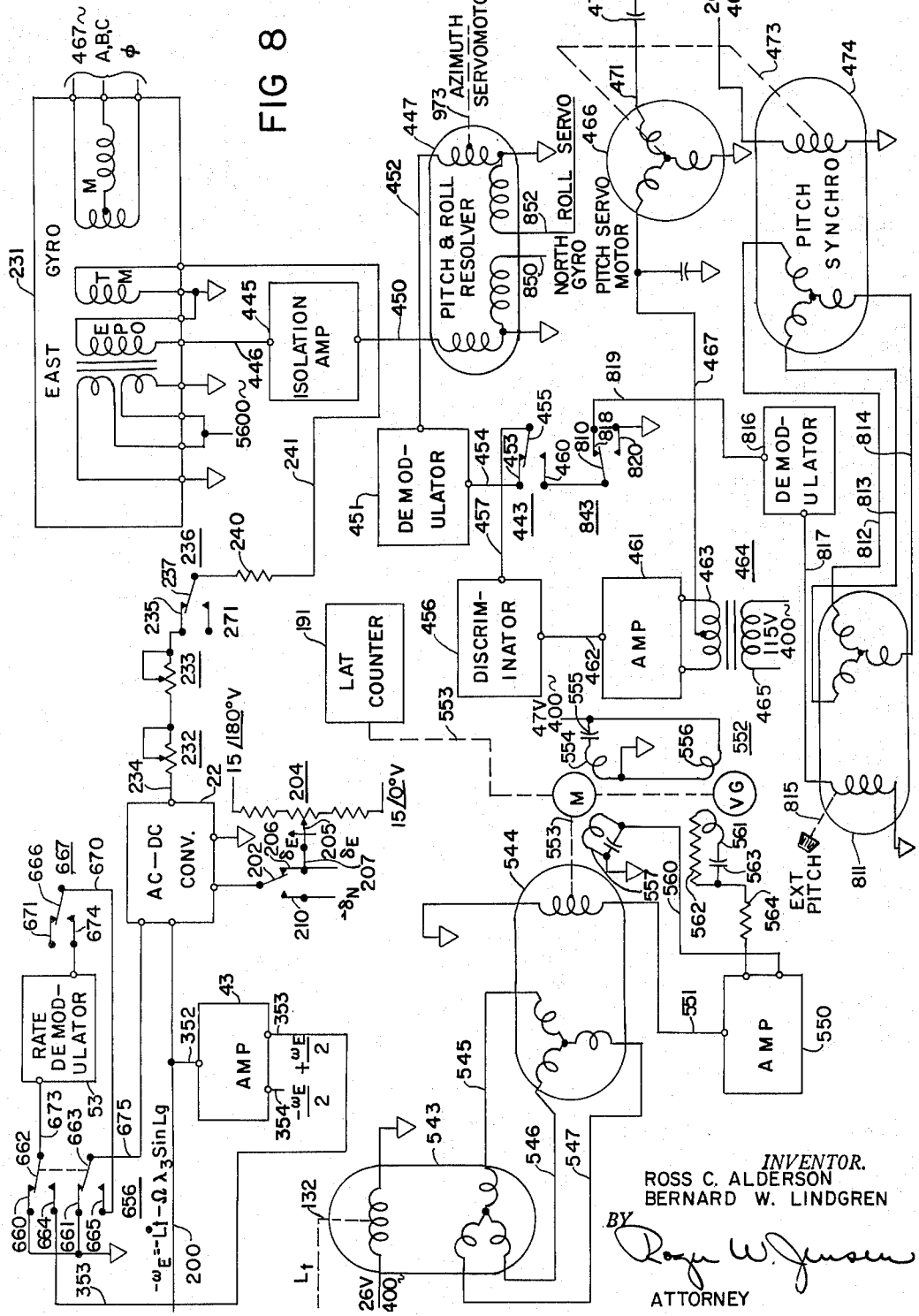
FIGURE 8 is a detailed drawing of the latitude display network and circuits associated with the stable platform and east gyro contained thereon.
Figure 10:
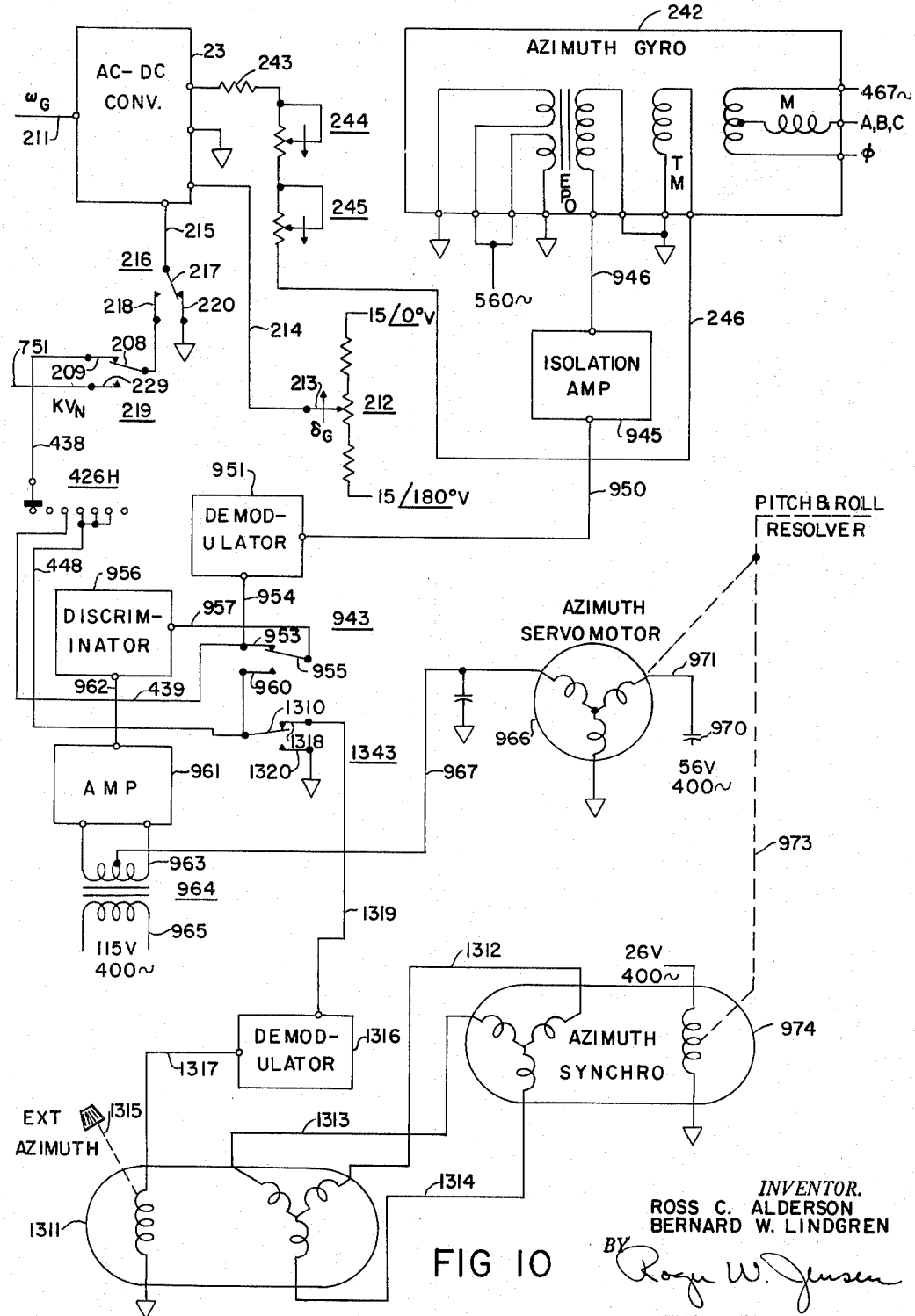
FIGURE 10 is a detailed drawing of the azimuth gyro and associated circuits of the stable platform.
Figure 12:
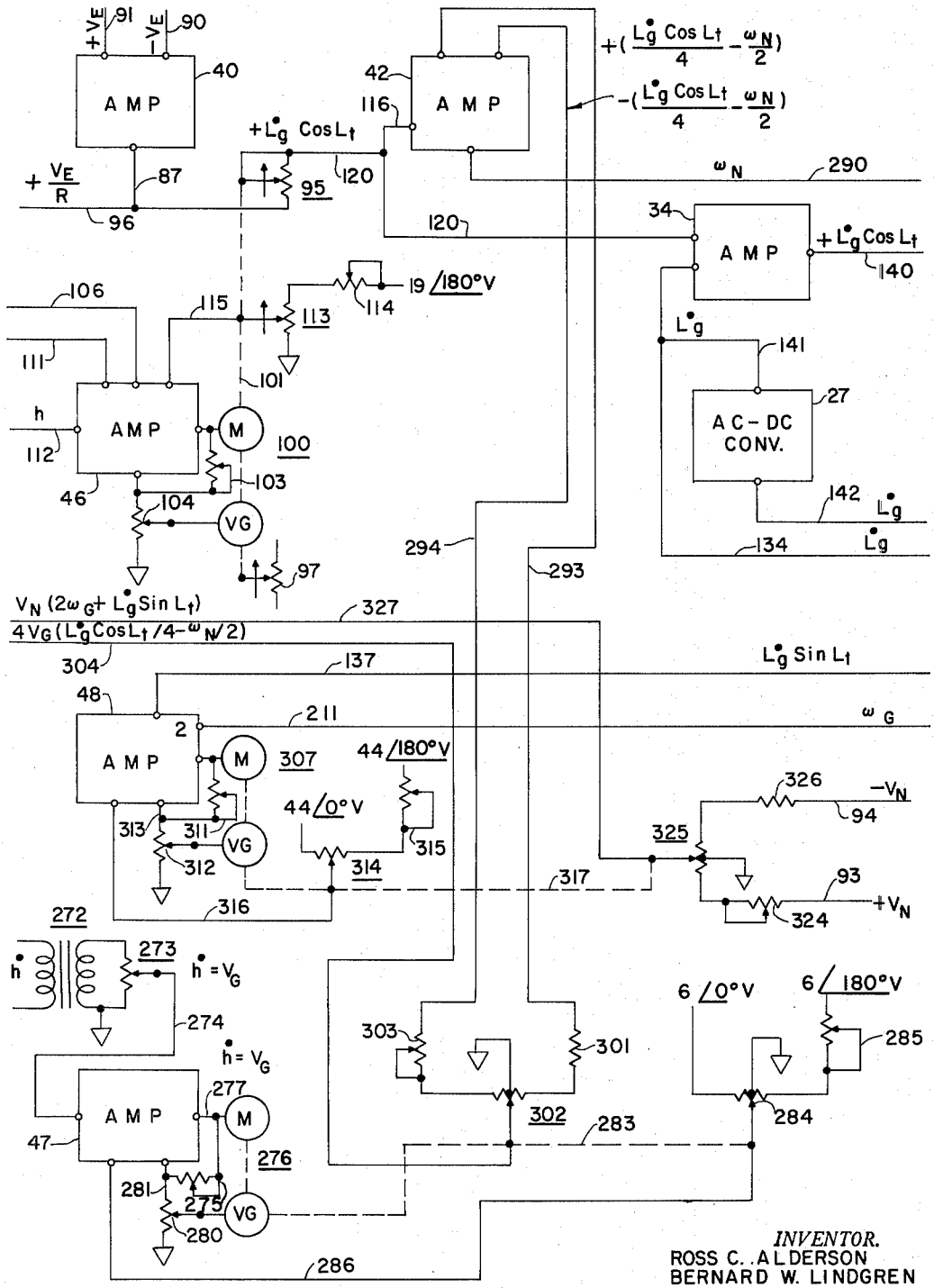
FIGURE 12 is a detailed schematic of the altitude, vertical rate, and north velocity multipliers as associated with the longitude loop circuits.
Figure 13:
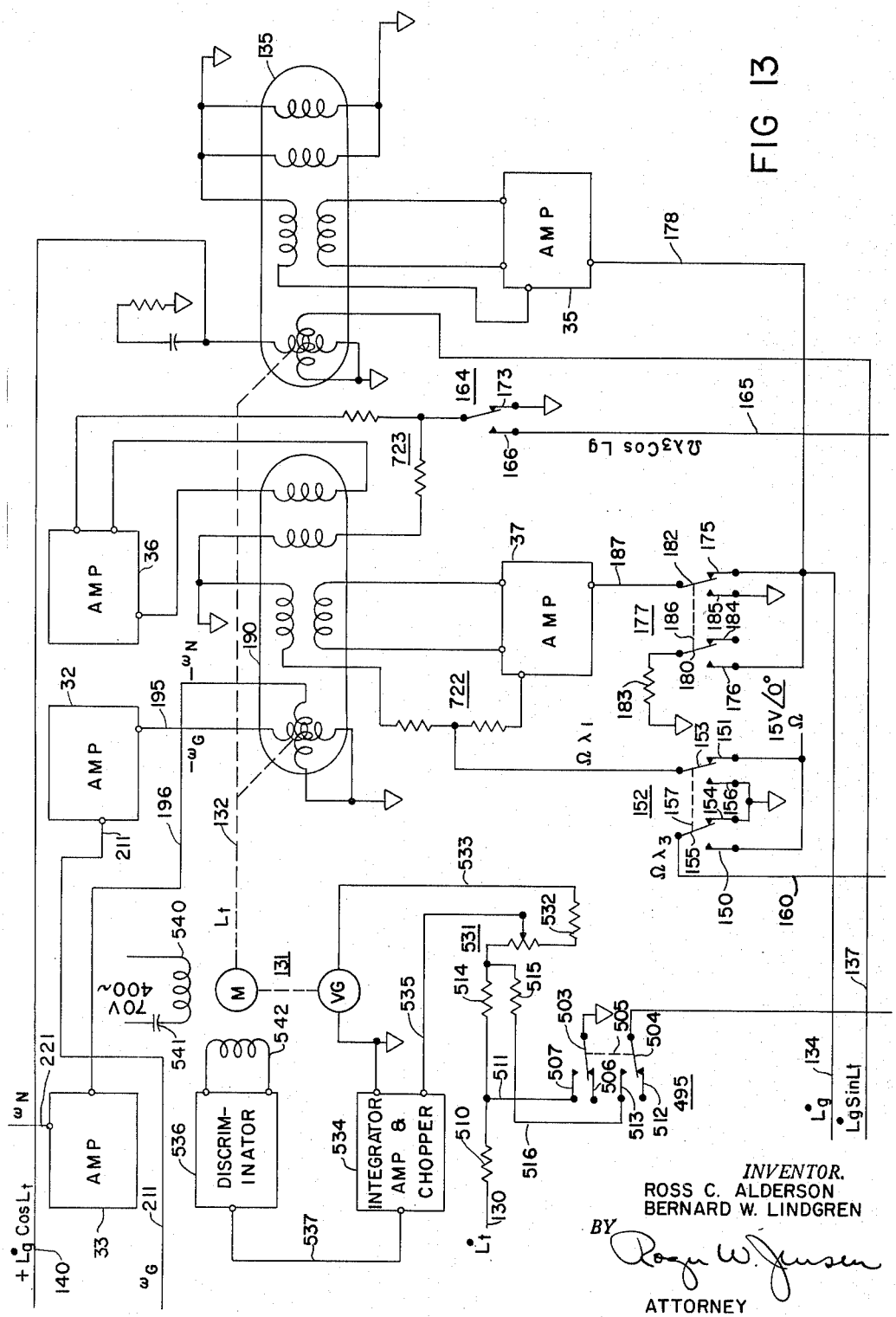
FIGURE 13 is a detailed diagram of the latitude integrator and its associated circuits in the longitude loop.

The operation of the azimuth circuits as seen in FIGURE 10 is basically symmetrical to that of the pitch circuits seen in FIGURE 8 and in order to simplify the explanation of the operation, it can best be followed by starting with the explanation of the latitude loop in the second paragraph preceding, beginning with the statement regarding isolation amplifier 445. It may be seen that by adding 500 to the reference numerals of the description starting with amplifier 445, the operation of the azimuth circuit may be followed with the exception that an additional pair of circuits through a switch section 426H are connected to contacts 953 and 960, respectively, of relays 943 and 1343 and that control shaft 1315 of the external azimuth synchro 1311 is set to a position 90° clockwise from the angle normally required to align the platform in azimuth. Since switch section 426H does not connect to either relay 943 or 1343 during the first two modes of operation, this circuit will not be discussed further at this point. Also in FIGURE 10 there is no resolver synchro 447 so lead 950 has been substituted for connecting leads 450 and 452 which are both connected to resolver synchro 447.

Switch 416 which appears in FIGURE 9 has a plurality of contacts, the first two beyond the off section being used to control platform and gyro heating circuits which will not be discussed here. The important contact is the third contact from the off position and when switch bar 415 of switch 416 is engaged with this contact, voltage is supplied to a relay coil 475k of a relay 475 through a connecting lead 476. The circuit is completed by having the other end of coil 475k connected to ground. As coil 475k is energized, a relay armature 477 is moved to engage relay contact 480 of relay 475. Relay contact 480 is connected to the power side of switch 411 through a connecting lead 481 so that voltage will be present on armature 477. A relay contact 482 which has no normal connection is engaged by armature 477 whenever power has not been applied to coil 475k. A Plaftorm Heading switch 483 is a three-position switch which is designated as Clockwise in one position and Normal in the other with an intermediate position. By the use of switch 483 in the clockwise position from the second through the fifth and part of the sixth mode of the system certain relays are actuated so that the east gyro, in effect, replaces the north gyro for initial alignment. In other words, the stable platform is displaced or rotated 90° in azimuth in a Clockwise direction. This rotated position of the stable platform is utilized to drift trim the gyros as will be explained later under the self-align mode of operation. During this period of operation, the output of the azimuth gimbal synchro is demodulated and excites the azimuth gyro torque motor and with the gyros running, the azimuth orientation is changed by creating an azimuth gyro error signal rather than by changing the input to the azimuth servo directly. This will become more evident as the operation is explained more fully. Platform Heading switch 483 has a pair of switch arms 484 and 485 which engage switch contacts 489 and 488 respectively when in the Normal position. When in the Clockwise position, switch arm 484 engages with switch contact 490 and switch arm 485 engages contact 491. A switch contact 486 is interposed between contacts 490 and 489 and a switch contact 487 is interposed between contacts 491 and 488, which is at the intermediate position. Since armature 477 of relay 475 has present a source of voltage, this voltage is sent to switch arm 484 through a pair of connecting leads 492 and 493. Lead 492 is also connected to switch terminals (*a*), (*b*), (*c*), (*d*), (*e*), and (*f*) of switch 426E by a connecting lead 494. A wiper arm of switch 426E is in contact with terminal (*a*) in the standby position and therefore a voltage is carried to a pair of relay coils 495*k* and 496*k* of relays 495 and 496 respectively (FIGURE 7) through a connecting lead 494'. The circuit is completed by having the other end of the relay coils connected to ground. Also connected to lead 492 is a contact 497 of a switch 500 through a connecting lead 501. Switch 500 contains a switch arm 500' which is normally in the open position. The switch is labeled Relocated or Normal and indicates whether the system is operated with a coordinate system having a computational pole located at the true north pole (Normal) or rotated south through an angle of 90° along a great circle path falling on the initial point of the path (Relocated). Switch 500 is operated manually prior to alignment of the system and is not operated again until the next flight or alignment procedure. This was briefly explained previously and will be dealt with more fully later. During Normal operation, relay coils 152*k* and 164*k* are not energized but during the relocated pole mode of operation switch arm 500' applies power to coils 152*k* and 164*k* through a connecting lead 502. For the present, it will be considered that switch 500 is in the Normal position.

Figure 7:
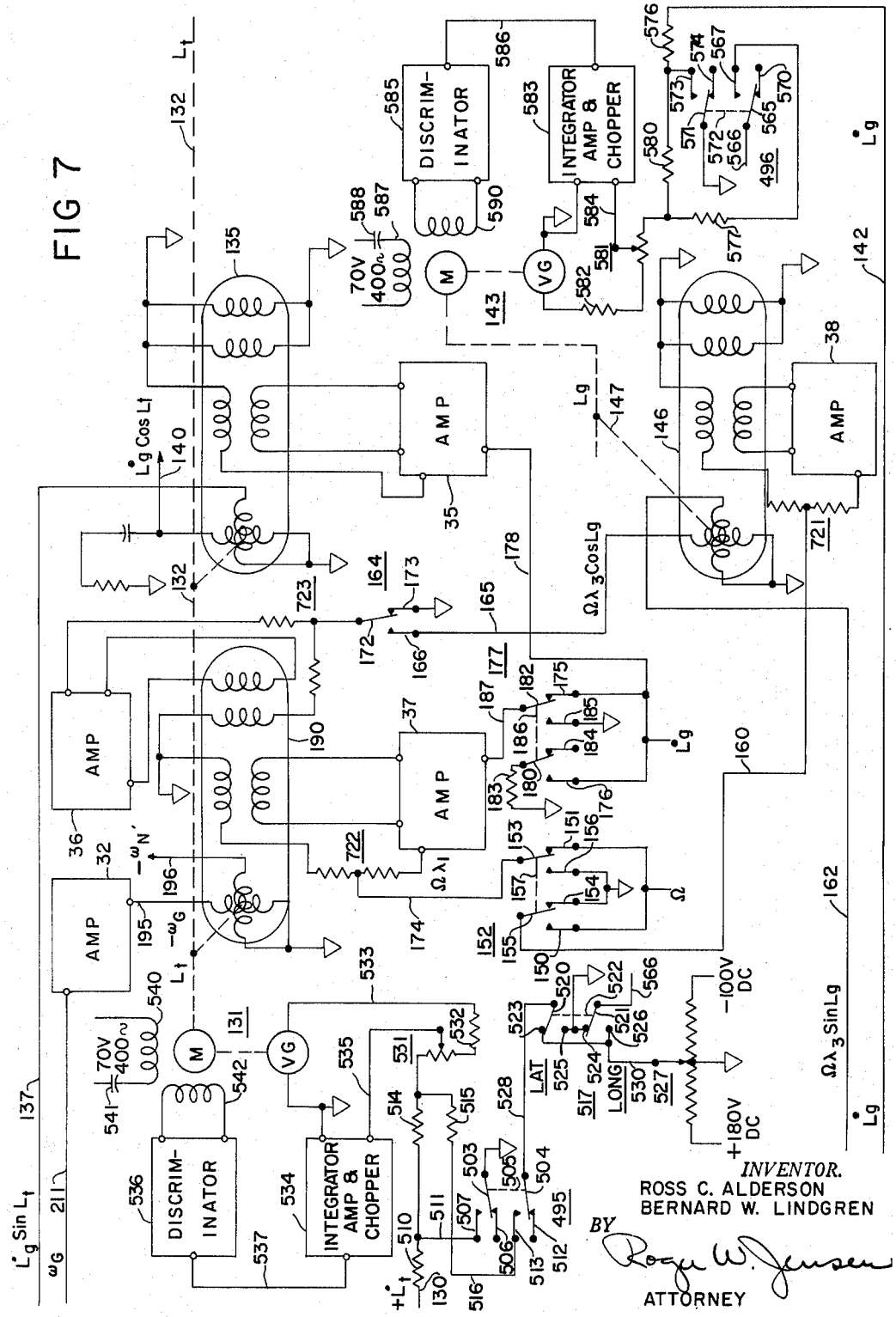
FIGURE 7 is a detailed diagram of the latitude integrator and the longitude integrator with associated circuits.

FIGURE 7 is a detailed diagram of the latitude integrator and the longitude integrator shown in semi-schematic form in FIGURE 3. It should be noted that much more detail has been included in the figures following 1, 2, 3 and 4 to more completely explain the actual operation of the present invention. FIGURE 7 contains relays 495 and 496 which perform certain functions which will now be described. Relay 495 has a pair of armatures 503 and 504 which are connected by a common link 505. Armature 503 is connected to ground, and engages a contact 506 which is normally open and not connected to a circuit. Another relay contact 507 is opposite contact 506 and is connected to connecting lead 130 which carries the $L_t$ signal through a resistor 510 and a connecting lead 511. Armature 504 engages a contact 512 which is also normally open and not connected to a further circuit. Another contact 513 opposite contact 512 is connected to resistor 510 through a pair of resistors 514 and 515 connected in series and further connected to contact 513 through a connecting lead 516. When relay coil 495*k* is energized, armatures 503 and 504 engage contacts 507 and 513 respectively. This causes the $L_t$ signal which is present on contact 507 to be connected to ground through resistor 510. Therefore an external signal must be provided to drive the latitude motor generator 131. A two position switch 517 is designated a latitude-longitude switch and for the following explanation the latitude position will be concerned. Latitude-longitude switch 517 is a double-pole double-throw type switch and comprises a pair of switch arms 520 and 521 connected by a link 522. Switch arm 520 engages a contact 523 and switch arm 521 engages a contact 524. Armature 521 is normally connected by means of lead 566 to an armature of relay 496 seen at the lower right corner of FIGURE 7. Another contact 525 opposite contact 523 is connected to ground, as is contact 524. A contact 526 opposite contact 524 is connected to switch contact 523 and to a wiper arm of a potentiometer 527 through a connecting lead 530. Switch arm 520 is also connected to armature 504 of relay 495 through a lead 528. A resistive element of potentiometer 527 is connected at one end to a positive direct voltage source labeled +180 v. D.C. in FIGURE 7 and the other end is connected to a negative direct voltage source label —100 v. D.C. with the resisitive element being center tapped to ground. Therefore as the wiper arm of potentiometer 527 scans the resisitive element it will pick off either a positive or negative direct current signal, or voltage, which will appear across resistors 514 and 515 when relay 495 is energized. Since it is desired to illustrate the operation of only the latitude counter and latitude resolvers at this time, it will be shown later that longitude motor 143 has its input grounded through contact 524 and armature 521. A resistive element of a potentiometer 531 has one end connected to the junction of the series connection of resistors 514 and 515 and has the other end connected to a resistor 532 which in turn is connected to one terminal of the velocity generator of motor generator 131 through a connecting lead 533. A wiper arm of potentiometer 531 picks off a voltage which is sent to an integrator amplifier and chopper 534 through a connecting lead 535. Potentiometer 531 is a calibration potentiometer and is adjusted to give a proper rate of change of latitude for a given input. The velocity generator of motor generator 131 has its terminal opposite the terminal connected to lead 533 connected to ground and integrator amplifier and chopper 534 is also connected to ground to complete the circuit. Integrator amplifier and chopper 534 contains a chopper which converts the direct current signal to one of alternating current and amplifies this signal which is sent to a discriminator 536 through a connecting lead 537. An excitation winding 540 of motor generator 131 is connected to an alternating voltage source of 70 volts through a phase shifting capacitor 541. A control winding 542 of motor generator 131 is connected to discriminator 536 to cause the motor to be driven in the proper direction and at a speed determined by the setting of the wiper arm of potentiometer 527. Thus in the Standby mode of operation, motor generator 131 may be driven at a rate corresponding to an initial value of latitude of the craft. This local latitude is then transmitted to resolver synchros 190 and 135 in the form of a shaft rotation through shaft 132. As shaft 132 is rotated, it also rotates a rotor of a transmitter synchro 543 shown in FIGURE 8. The rotor has one end connected to ground and the other end is connected to an alternating voltage source of 26 volts. The stationary windings of transmitter 543 are connected to corresponding windings of the receiver synchro 544 through three connecting leads 545, 546, and 547. The field produced by the rotor of synchro 548 is therefore impressed upon the stationary winding of synchro transmitter 543 and this field appears in the stator winding of receiver synchro 544. Since connecting leads 545, 546, and 547 may be of any length, it may be convenient to locate the receiver synchro 544 and its associated circuitry at a remote position. A rotor of receiver synchro 544 has the electrical field impressed across its windings. Normally the position at which the rotor of receiver synchro 544 is oriented, if compared to the rotor of the transmitting synchro 543, is at approximately 90° to that of the rotor of synchro 543 and will produce a minimum signal while the rotor of transmitting synchro 543 produces a maximum signal. Since the operation of transmitting and receiving synchros is of common knowledge it will not be discussed further, but the use of the synchro in the circuit will now be described. The rotor of receiving synchro 544 has one end connected to ground and the other end is connected to an amplifier 550 through a connecting lead 551. A motor generator 552 has a common shaft 553 which is mechanically connected to the rotor of receiver synchro 544 and is also connected to latitude counter 191. The motor of motor generator 552 has an excitation field 554 which is excited through a phase shifting capacitor 555 by an alternating voltage source and which is grounded on the other end. In like manner, an excitation field 556 of the velocity generator of motor generator 552 also has one side connected to ground and the other to the high side of an alternating voltage source. The control field 557 of the motor is connected to ground on one end as is one side of a capacitor. The other end of control field 557 and the other side of the capacitor are connected to amplifier 550 through a connecting lead 560. As the motor rotates the velocity generator, a signal is produced on a control winding 561 which is dropped across resistor 562 and a capacitor 563 which are connected in series. A resistor 564 is connected at the junction of resistor 562 and capacitor 563 on one end and is connected to amplifier 550 on the other end to provide a rate feedback signal. Synchro 544 has its rotor driven to a position representative of the latitude of the craft.

After the latitude counter 191 has been set to its correct value the longitude circuits (FIGURE 15) must be energized to drive the longitude counter to set value of the longitude of the craft. This is accomplished by placing the latitude-longitude switch 517 in the longitude position or in other words engaging switch contacts 525 and 526 by armatures 520 and 521 respectively. It will be noted that as armature 520 is in contact with terminal 525 the latitude input circuits are grounded which lead to the integrator amplifier and therefore motor generator 131 will not rotate. Since armature 621 engages contact 526, a voltage will be supplied to an armature 565 of relay 496 through a connectting lead 566. Since relay coil 496k is energized, armature 565 will be in contact with relay contact 567 which is opposite a relay contact 570 which is not connected to any further circuit. Another armature 571 is connected to armature 565 by a common link 572 and armature 571 is connected to ground. Armature 571 engages a relay contact 573 when coil 496k is energized and engages a rely contact 574 when the relay coil is not energized. Relay contact 574 is not connected to a circuit and is open. The $L_g$ signal, which normally appears on a connecting lead 142 that is connected to relay contact 175 of relay 177, is dropped across a resistor 576 and hence to ground when relay coil 496k is energized. Thus the input to the amplifying circuits which follow will not receive a longitude rate signal. The voltage appearing on relay armature 565 and contact 576 is dropped across a pair of resistors 577 and 580 which are connected in series and further connected to ground through relay contact 573. A resistive element of a potentiometer 581 has one end connected to the junction of resistors 577 and 580 and the other end of the resistive element is connected to the velocity generator of motor generator 143 through a resistor 582. The other side of the velocity generator circuit is connected to ground. A wiper arm of potentiometer 581 is connected to an integrator amplifier and chopper 583 through a connecting lead 584 and the circuit is completed by having the integrator amplifier and chopper connected to ground. The amplified signal is sent to a discriminator 585 through a connecting lead 586. The motor of motor generator 143 has an excitation field 587 which is connected to an alternating voltage source of 70 volts through a phase shifting capacitor 588. A control winding 590 is connected to discriminator 585 to cause motor generator 143 to rotate. A feedback signal is then obtained from the velocity generator of motor generator 143 and is fed back and combined at potentiometer 581 to be used in integrator amplifier and chopper 583. The wiper arm of potentiometer 581 is calibrated in the same manner as potentiometer 531 described in the second paragraph preceding, except that the value of latitude is replaced by that of longitude. As motor generator 143 is caused to rotate, shaft 147 is driven at a rate representative of the longitude to be displayed on the longitude counter 148. As shaft 147 is rotated, it also rotates a motor of a transmitter synchro 593. The rotor has one end connected to ground and the other end is connected to an alternating voltage source of 26 volts. The stationary windings of transmitter 593 are connected to corresponding windings of a receiver synchro 594 through three connecting leads 595, 596 and 597. The field produced by the rotor of synchro 593 is therefore impressed upon the stationary winding of synchro transmitter 593 and this field appears in the stator winding of receiver synchro 594. Since connecting leads 595, 596 and 597 may be of any length, it may be convenient to locate the receiver synchro 594 and its associated circuitry at a remote position. A rotor of receiver synchro 594 has the electrical field impressed across its windings. Normally the position at which the rotor of receiver synchro 594 is oriented, if compared to the rotor of the transmitting synchro 593, is at approximately 90° to that of the rotor of synchro 593 and will produce a minimum signal while the rotor of transmitting synchro 593 produces a maximum signal. The rotor of receiving synchro 594 has one end connected to ground and the other end is connected to an amplifier 600 through a connecting lead 601. A motor generator 602 has a common shaft 603 which is mechanically connected to the rotor of receiver synchro 594 and is also conected to longitude counter 148. The motor of motor generator 602 has an excitation field 604 which is excited through a phase shifting capacitor 605 by an alternating voltage source and which is grounded on the other end. In like manner, an excitation field 606 of the velocity generator of motor generator 602 also has one side connected to ground and the other to the high side of an alternating voltage source. The control field 607 of the motor is connected to ground on one end, as is one side of a capacitor. The other end of control field 607 and the other side of the capacitor are connected to amplifier 600 through a connecting lead 610. As the motor rotates the velocity generator, the signal is produced on a control winding 611 which is connected in series with a resistor 612 and a capacitor 613. A resistor 614 is connected at a junction of resistor 612 and capacitor 613 on one end, and is connected to amplifier 600 on the other end to provide a rate feedback signal. Synchro 594 has its rotor driven to a position representative of the longitude of the craft.

As lead 492 (FIGURE 9) carries a voltage due to the energization of relay 475, terminal (a) of a switch section 426F is supplied with voltage through a connecting lead 615 and a wiper arm of switch 426F. Switch terminals (a), (b), (c), (d), and (e) are connected together and relay coils 122k and 177k are energized by connecting these terminals to the switch wiper arm through a connecting lead 616 and completing the circuit by having the relay coils connected to ground. When relay coils 122k and 177k are energized, it may be seen that amplifier 31 has its input grounded (FIGURE 6), and the input through 187 to amplifier 37 (FIGURE 7) is also grounded as well as the input to amplifier 35 which is grounded through a resistor 183. Thus there are no output signals emerging from resolver synchros 190 and 135. It can be seen more clearly in the semi-schematic representations, FIGURE 3, that connecting the inputs of amplifiers 35, 36 and 37 to ground will reduce the outputs of resolver synchros 190 and 135 to zero.

Figure 4:
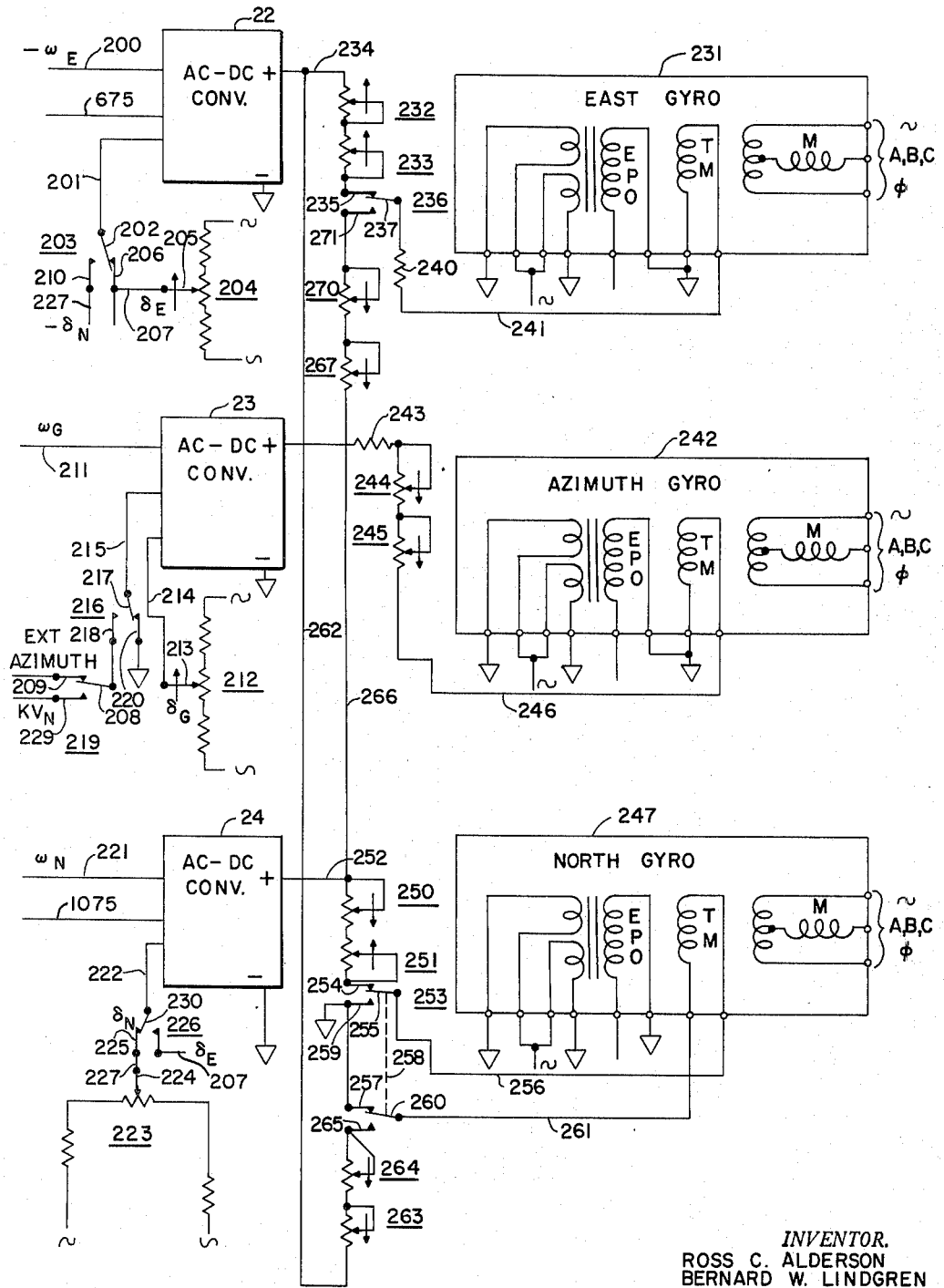

Another switch section 426G has a wiper arm connected to connecting lead 492 by a connecting lead 617, and is connected to terminals (a), (b), and (c) which are connected together. These three terminals are connected to relay contact 619 of a relay 637 which contact is engaged by an armature 618 which is connected to a relay coil 216k of relay 216 (FIGURES 4 and 10). As seen in FIGURE 10, upon the energization of coil 216k, armature 217 engages contact 218 and provides an external azimuth signal to A.C.–D.C. converter 23. Another contact 638, opposite relay contact 619, which is open as long as coil 637k is not energized, is connected to the wiper arm of switch section 426F by a connecting lead 639. Another switch section 426H (FIGURE 10) has a wiper arm connected to relay contact 209 of relay 219 through a connecting lead 438 and it will be noted that during the Standby mode of operation the wiper arm makes contact with switch terminal (a) which has no further connection and therefore input lead 215 to A.C.–D.C. converter 23 forms an open circuit with the switch arm of switch 426H.

As stated earlier, when the Platform-Heading switch 483 is in the clockwise position, the stable platform is rotated 90° clockwise in azimuth and therefore the signals normally being sent to the north components will be switched to the east components and the signals normally being sent to the east components will be switched to the north components. Switch 483, when placed in the Clockwise mode of operation supplies a voltage through a connecting lead 620 to the following relay coils: 253k, 236k, 75k, 371k, 362k, 203k, 226k, and an eighth coil 621k.

Beginning with relay 253, as may be seen from FIGURES 4 and 14 the connections to the torque motor of north gyro 247 are reversed by having armature 255 in contact with a ground connection and armature 260 engaged with contact 265 to be supplied with an east torquing signal. In like manner relay 236 as found in FIGURES 8 and 4 has armature 237 engaged with contact 271 to provide a north torquing signal to the east gyro. At the same time relay 75 (FIGURE 2) changes the $-V_N$ signal to a $-V_E$ signal and vice versa which are the outputs of the integrator acelerometers. This of course requires that the torquing signals to the accelerometers be changed and this is accomplished by the actuating of relays 371 and 362 (FIGURE 1). As relay armature 361 of relay 362 becomes engaged with contact 383, the signal from A.C.–D.C. converter 26 ordinarily applied to east accelerometer 71 is applied to the torque motor of north accelerometer 70 and in like manner a signal from A.C.–D.C. converter 25 is sent to the torque motor of east accelerometer 71 by armature 370 of relay 371, as well as providing a phase reversal to the torque motor. This also requires that the drift trim signals to the gyros be changed and this is accomplished by relays 203 and 226 (FIGURE 4) by having armature 202 engaging contact 210 to supply a negative north drift signal from potentiometer 223 to A.C.–D.C. converter 22 and applying an east drift signal from potentiometer 204 to A.C.–D.C. converter 24. A phase reversal in the north drift trim signal is provided by relay 621 (FIGURE 14) to A.C.–D.C. converter 24 by having the resistive element of potentiometer 223 connected to a pair of armatures 622 and 623 of relay 621. The armatures are connected by a link 624 and during energization of coil 621k, armature 622 engages a contact 625 and armature 623 engages a contact 626. During normal operation armature 622 engages a contat 627 and armature 623 engages a contact 630. Contacts 625 and 630 are connected by a lead 631 and contacts 627 and 626 are connected by a lead 632. Contact 626 is energized through a variable resistor 633 at one terminal of an alternating voltage source and contact 630 is energized through a variable resistor 634 by the other terminal of an alternating voltage source. The voltage applied is representative of earth rate Ω.

Coarse mode

The next step is to change System Mode Selector switch 426 to the Coarse Alignment mode of operation and it may be seen that the wiper arm of section 426B is moved to terminal (b) so that coil 843k becomes de-energized and allows armature 810 to engage contact 818.

Upon armature 810 engaging contact 818, it will be noted that the circuit from pitch synchro 474, through external pitch synchro 811 and demodulator 816 is no longer placed at ground potential and the signal now appears on armature 460 of relay 443. As will be shown in a moment, this signal will descend from contact 460 through armature 455 and hence to pitch servomotor 466 to position the pitch servomotor, and the associated pitch gimbal to a position representative of the angle set in by the control shaft 815 of external pitch synchro 811. Thus the pitch gimbal will be set at an initial coarse alignment position.

The holding circuit of relay 427 provides voltage to switch section 426C so that coils 396k and 796k are still energized. Switch section 426D is moved to position (b) where relay coils 443k, and 943k are still energized so that the gyro servo loops are coarse aligned as just explained. Switch sections 426E, 426F, 426G and 426H produce no change over the previous operation. In other words in the Coarse Alignment mode of operation, the platform gimbal servos drive the gimbals to the position of the external alignment synchros since the platform servo inputs are now obtained from the external pitch, roll, and azimuth synchros and demodulators. The platform gimbals are driven to the initial azimuth plus 90° clockwise and to a zero of aircraft pitch and roll.

Gyro spin

In the GYRO SPIN MODE position, the spin motors of the platform gyros and accelerometers are energized and brought up to speed. As switch 426 is advanced to the Gyro Spin position, switch sections 426B, 426C and 426D produce no change over the previous operation. In like manner, switch sections 426E, 426F, and 426G produce no changes in the relay switch. Switch section 426H (FIGURE 10) does produce a change over the previous operation and this will now be described. The switch arm of switch 426H engages terminal (c) which is connected to relay contact 953 through a connecting lead 439. The external azimuth signal still appears at the input to azimuth servo motor 966, since relay 943 is energized, while the signal from the error pickoff is carried through connecting lead 439 and through switch section 426H, to appear as an input on connecting lead 215, at A.C.–D.C. converter 23. Therefore, the loop is closed around the azimuth gyro, from the error pickoff to the torque motor, and at the same time the azimuth servo motor is driven by the 90° clockwise signal from external azimuth synchro 1311.

Gyro stabilization mode

After the gyros have come up to speed, switch 426 is switched to the Gyro Stabilization position which corresponds to switch terminal (d) and during this mode of operation switch sections 426B and 426C remain electrically unchanged as do sections 426E and F. In this mode of operation, the platform servo inputs will be switched from the synchro coarse alignment signals to the resolved gyro output signals so that the platform is gyro stabilized in earth coordinates. Earth rate precession signals are applied to the azimuth and north gyros since the latitude and longitude resolver shafts have been set to the correct position. This is accomplished by having the switch arm of switch section 426D in contact with switch terminal (d) which is connected to wiper arm 485 of switch 483 through a connecting lead 635. Terminals (e) and (f) of switch section 426D are also connected to lead 635. Wiper arm 485 is in contact with switch contact 491 since the system is in the clockwise heading in which case coil 637K is energized through lead 645 and normally closed push button switch 646, by depressing the push button of switch 641. This also applies if wiper arm 485 is in engagement with switch contact 488. However, if the wiper arm should engage contact 487, a voltage will be sent to an armature 636 of relay 637 through a connecting lead 640. A normally open push button switch 641 has one of its terminals 642 connected to armature 636 and has another terminal 643 connected to a contact 644 of relay 637 through a connecting lead 645. Lead 645 also connects wiper arm 485 of switch 483 to relay contact 644. Another normally closed push button switch 646 has a terminal 647 which is connected to switch terminal 642 and has another terminal 650 which is connected to one end of a relay coil 637k of relay 637. The other end of the coil is connected to ground to complete the circuit. The push button of switch 641 is depressed to engage contacts 642 and 643 to cause relay coil 637k to become energized if switch arm 485 does not engage switch terminal 487.

Since relay coil 637k is energized, armature 618 engages contact 638 and thereby applies a voltage from leads 414, 481, 492, 615 and 639 to relay coil 216k. Without this alternate path the voltage to energize relay coil 216k would be lost as the connecting lead 628 is deenergized when the wiper arm of switch section 426G is moved from terminal (c) to (d). The signal from external azimuth synchro 1311 which appears on contact 1318 of relay 843 is sent to terminals (d), (e), and (f) of switch section 426H through a connecting lead 448 and from terminal (d) through the wiper arm of switch section 426H to continue on through the contacts of relays 219 and 216 to appear as an input on A.C.–D.C. converter 23. The external azimuth gyro signal passes through the torque motor TM of azimuth gyro 242 and the resulting precession sends a signal from the error pickoff to relay contact 953 and armature 955 of relay 943, and hence to azimuth servomotor 966 which drives shaft 973 to null azimuth synchro 974. When a large external signal from synchro 1311 is applied to the torque motor of gyro 242 the torque motor may drive the gimbal against its stops. The switching mode just explained prevents the azimuth gyro gimbal from being slammed against its stop and damaged when changing the azimuth orientation. Switch 641 is generally known as the Azimuth Gyro Torquer On switch and switch 646 is known as the Azimuth Gyro Torquer Off switch.

Accelerometers on mode

Switch 426 is next advanced to the Accelerometers on mode position which is represented by terminal (e) and it will be noted that relays 396 and 796 are de-energized, thereby allowing the accelerometer servo loops to become active again. With the relay in this position, the computer circuit begins to function, which is a direct feedback around each accelerometer and the next effect is to convert the integrating accelerometers into non-integrating accelerometers, that is, the signal output is directly proportional to input acceleration rather than to the time integral of input acceleration. In this position if the platform is vertically misaligned, the accelerometers will pick up a component of gravity. There are no changes in the electrical output from switch sections 426B, 426D, 426E, 426F and 426H. Switch 426G has a wiper arm which will be in contact with switch terminal (e) to provide a voltage to relay coil 332k through a connecting lead 651, a relay armature 652 of relay 653, a relay contact 654 of relay 653 and a connecting lead 655. Since relay coil 322k is energized relay armature 331 (FIGURE 1) engages contact 334 to provide a signal representative of the north velocity to converter 25 which will be used to energize the torque motor of east accelerometer 71 as relay 371 and relay 362 are also energized. In like manner, the signal representative of east velocity which appears on relay armature 336 will be sent to converter 26, as the armature is in contact with relay contact 340 and this signal will appear on the torque motor of north accelerometer 70.

Self align mode

The next step in the operation of the system is to change System Mode Selector switch 426 to the Self Align Mode position which is represented by switch terminal (f). By examining the switching diagram it will be seen that switch sections 426B, C, D, E, G and H are not changed and therefore their electrical circuits will remain the same as before. Switch section 426F has the wiper arm engaged with switch terminal (f) which is connected to a pair of relay coils 656K and 657K of relays 656 and 657 respectively, by a lead 658. The operation of relay 657 will be explained later. Relay 656 has a pair of contacts 660 and 661 (FIGURE 8) which are connected to ground and are engaged by a pair of armatures 662 and 663 respectively. Armatures 662 and 663 are mechanically connected together by a common link. Another pair of relay contacts opposite those just described are contact 664 opposite contact 660, which is connected to amplifier 43 through a connecting lead 353, and relay contact 665, opposite contact 661, which is connected to an armature 666 of a relay 667, through a connecting lead 670. Armature 666 engages a contact 671 which has no circuit connected. Armature 662 of relay 656 is connected to the input of a rate demodulator 53, through a connecting lead 673. Demodulator 53 has its output connected to a relay contact 674 which is opposite contact 671 of relay 667. Armature 663 is connected to A.C.-D.C. converter 22 through a connecting lead 675. Demodulator 53 contains a differentiating network in the output of the demodulator, and for this particular application, involves the use of a capacitor and resistor network. Before proceeding further with the Self-Alignment mode of operation, switch 646 (FIGURE 9) must have the push button energized so that the azimuth gyro torque motor relay coil 637k is de-energized. After relay coil 637k becomes de-energized, armature 618 returns to its normally de-energized position and engages contact 619 which now receives no voltage through connecting lead 628. Therefore, relay coil 216k also becomes de-energized and once again returns armature 217 of relay 216 (FIGURE 10) to its de-energized position of engaging contact 220 which is connected to ground. In this normal position A.C.-D.C. converter 23 has connecting lead 215 connected to ground so that the external azimuth gyro torquing signal is grounded thereby retaining the azimuth alignment. Because relay 637 is de-energized, armature 636 engages a contact 676 and a second armature 677 moves from a contact 680 to a contact 681. Armatures 636, 618, and 677 are connected together by a common link. The voltage which energized relay coils 656k and 657k also appears on relay contact 681 through a connecting lead 682. Since the voltage also appears on armature 677 it is sent to a switch contact 683 of a switch 684 through a connecting lead 685. Switch 684 is designated as the Rate Level switch. Switch 684 is of the push button type in which a pair of contacts 686 and 687 are normally closed by the switch push button. Contact 683 is normally in the open position as well as another contact 688, with respect to the push button. Another switch 690 termed Rate Level and Azimuth Align, contains a push button 691 which is connected to switch contact 683 by a connecting lead 692, and push button 691 is normally open with respect to a pair of switch contacts 693 and 694. Switch contacts 686 and 693 are connected by a lead 695 and switch contact 688 is connected to switch contact 694 by a lead 696. By energizing the push button of switch 684, the voltage which appears on switch contact 683 is transferred to 688 and hence to contact 694. The voltage is then carried to relay coils 653k and 667k through a connecting lead 700. A holding coil circuit is shown for relay coil 653k in which switch contact 683 is connected to a relay contact 701 of relay 653, through a connecting lead 702. Relay 653 has in addition to armature 652 an armature 703, which will become engaged with relay contact 701 upon coil 653k becoming energized. The voltage passes through armature 703 to coils 653k and 667k through a connecting lead 704. Before coil 653k is energized armature 703 is engaged with a contact 705, which is not connected to any circuits. After coil 653k becomes energized, armature 652 engages a contact 706 which is normally open as is 705. Since a latching circuit has been energized, the release of the push button of switch 684 leaves the three previously mentioned relay coils energized and hence the relays are actuated. As armature 652 disengages contact 654, relay 332k becomes de-energized and allows armatures 331 (FIGURES 1 and 5) and 336 (FIGURES 1 and 11) to become engaged with relay contacts 333 and 341 respectively. It will be seen that by the energization of coil 667k (FIGURE 9) armature 666 (FIGURE 8) of relay 667 (FIGURES 8 and 14) is engaged with contact 674 and thereby the demodulated rate signal is presented to A.C.-D.C. converter 22. With the accelerometers operating in their normal manner, the signal emerging from the accelerometer is proportional to velocity and the rate network in demodulator 53 provides damping so that the circuit operates as a damped Schuler pendulum.

Since the platform is in the clockwise orientation, azimuth misalignment will cause the north gyro which is now pointed east to pick up a component of the earth's rate. This component will tilt the platform about the north axis of the platform which is now pointed east, by a torque from the north gyro and the tilt causes the east accelerometer to pick up a component of gravity which is applied to the azimuth gyro to null, or wash out the earth's rate signal as sensed by the north gyro.

The next step is to press push button 691 of the Rate Level and Azimuth Align switch so that it engages contacts 693 and 694 which produces no change in the energization of relay coils 653k and 667k. However, since push button 691 contains a voltage, the voltage will appear on switch contacts 686 and 687 through contact 693 and lead 695 where contact 687 is connected to a pair of relay coils 219k and 710k through a connecting lead 711. A relay coil locking circuit is energized by having voltage applied to an armature 712 of relay 710 through a connecting lead 713 which is connected to relay contact 701. Since armature 712 is actuated, it engages a relay contact 714 which is connected to switch contact 686 through a connecting lead 715. Thus there are two parallel paths of voltage to energize relay coils 219k and 710k. At the same time that armature 712 becomes engaged with contact 714, another armature 716 becomes engaged with relay contact 717 which is also connected to switch contact 687 through connecting lead 711. Armature 716 is connected to relay coil 216k through a connecting lead 720. Therefore, an alternate path to coil 216k is formed by lead 720. Due to the fact that relays 216 and 219 (FIGURE 10) are both energized, the azimuth alignment signals are obtained from north accelerometer 70. This is accomplished by having armature 217 of relay 216 engage contact 218 and hence the signals are obtained through armature 208 and contact 229, which is connected to a lead 751. Lead 751 is further connected to an amplifier 50 (FIGURE 5) which has an input lead 752 which is connected to lead 441. Amplifier 50 has a phase shifting network 753 which is excited by the output of amplifier 50 through a connecting lead 754 and the output of phase shifting network 753 is coupled back to amplifier 50 through a connecting lead 755. The phase shifting network is adjusted to provide the desired output from amplifier 50 and the $KV_N$ signal which is derived from the north velocity signal is used as a correction signal to be applied to the azimuth gyro since this velocity signal is interpreted by the computer to appear as a rate caused by earth's rotation. Upon a release of push button 691, the circuits just described will not be changed and, during this mode of operation potentiometer wiper arm 205 (FIGURE 4) of east gyro drift potentiometer 204 is adjusted to correct for the inherent drift of east gyro 231.

The next procedure in the Self-Alignment mode, is to operate the platform heading switch 483 (FIGURE 9) from the Clockwise mode to the Normal mode of operation. By switching to the normal mode of operation, relays 253 and 236 (FIGURE 4) change the signal to the north gyro torque motor from A.C.-D.C. converter 22 to A.C.-D.C. converter 24, and change the signal to the east gyro torque motor from A.C.-D.C. converter 24 to A.C.-D.C. converter 22. Also, relay 75 (FIGURE 2) is placed in its normal position by the de-energization of coil 75K so that the $+V_N$ and $-E_E$ signals seek their normal path, and the signals to the north accelerometer torque motor and east accelerometer torque motor, are changed back to their normal operating values by relays 371 and 362 (FIGURE 1). Relays 203 and 226 (FIGURE 4) return the proper drift signal for the 90° azimuth change to A.C.-D.C. converters 22 and 24, and relay 621 (FIGURE 14) changes the sense of the earth rate signal being applied across potentiometer 223. During this period of operation, the platform will be driven by signals from the azimuth gyro and these signals will be sent to the azimuth motor to torque the platform until the platform components are in their normal orientation. It must be remembered that when the Clockwise-Normal switch 483 was rotated from the Clockwise to the Normal position wiper arm 485 became engaged momentarily with contact 487, contact 487 thereby applying a voltage to relay coil 637k which caused armature 618 to engage contact 638 which has voltage supplied to it through connecting lead 639 which was connected to the wiper arm of switch section 426F. Armature 618 supplies a voltage to relay coil 216k so that the external azimuth signal from synchro 1311 is applied to A.C.-D.C. converter 23 via relay 1343, switch section 426H and relay 219 because the energization of relay coil 637k caused armature 677 to lose its excitation and therefore relay coils 219k and 710k are unenergized. This also applies to relay coils 653k and 667k which are also de-energized upon the switching from the clockwise to normal motor operation. The system will be left in this mode of operation until the platform components are in the normal oriented positions. After the platform components are in their normal oriented positions, the external azimuth control shaft 1315 would be rotated back to a 90° counter clockwise position or to the normal position to provide the proper azimuth alignment for the platform. This may be accomplished by the use of a pair of synchros and switching back and forth between the two fixed synchros rather than rotating a single synchro. After this, the push button of switch 646 is depressed which de-energizes relay coil 637k and allows relay armatures 636, 677, and 618 to return to their de-activated position. After the push button of switch 684 has been depressed the operation of the circuit will be performed in the same manner as just previously described after entering the Self-Align mode of operation and before operating switch 483 to the normal position, since the only major change has been the rotation of the platform through a 90° counter-clockwise angle. After an appropriate time for the Rate Leveling mode of operation the Rate Level and Azimuth Alignment switch 690 will be energized by depressing push button 691 and repeating the process previously described. During this mode of operation, if a north-south velocity signal is detected, potentiometer 212 should be adjusted to correct the drift of the azimuth gyro and if an east west velocity signal is detected, indicating a drift of the north gyro, this should be corrected by adjusting potentiometer 223 (FIGURE 4) to correct for the drift of north gyro 247.

The last step in the alignment operation is to operate System Mode Switch 426 to the Flight Mode position and where terminal g of all sections of switch 426 is in the de-energized mode of operation thereby removing the voltage from all of the relay coils controlled by System Alignment Switch 426.

The remaining mode of operation to be discussed is controlled by the Computational Pole location switch 500 (FIGURE 9) which controls relays 152 and 164 (FIGURE 1). With switch 500 in the relocated position as briefly described previously, the position of the computational poles is relocated 90° to the south along the great circle path which passes through the initial starting point of the flight. In other words the computational pole is relocated, to lie at a point on the equator which is intersected by the initial meridian of latitude. This is accomplished by adding the appropriate signals from longitude resolver 146 to the gyro torque signals to correct for the fact that the pole has been electrically relocated by 90°. This is done by the action of the Computational Pole Location switch 500 in switching armatures 155 and 153 by energization of coil 152k of relay 152 (FIGURES 3 and 13) to the relocated pole position such that the earth rate signal $\Omega$ is fed to amplifier 38, and armature 153 is at a ground potential thereby causing $\lambda_1$ to equal zero, and $\lambda_3$ to equal $-1$. Simultaneously, relay 164 by the energization of 164k is caused to have armatures 170 and 172 engaging contacts 163 and 166 respectively. The net result of the switching just described is that the signal $-\omega_N$ has the term $\Omega\lambda_1$ equal to zero. In normal operation the term $-\Omega\lambda_3 \sin L_t \cos L_g$ is equal to zero. In like manner, the term $-\omega_G$ has the term $\Omega\lambda_1$ equal to zero whereas during normal operation the term $-\Omega\lambda_3 \cos L_t \cos L_g$ is equal to zero. The term $-\omega_E$ is also affected in that the term $-\Omega\lambda_3 \sin L_g$ which is normally equal to zero now takes on a finite value. A reason for using the relocated pole mode of operation is evident if the platform is to be operated over the north or south pole, where the platform must swing discontinuously through 180 degrees in achieving its aim of keeping the north accelerometer pointing north. Either pole is then a point of discontinuity in the system. This in itself is not perhaps limiting since a flight could be flown which would miss the poles slightly; however, the discontinuity at either pole also affects the surrounding arctic regions which are measurably close to the pole with the implication that intolerable errors in the heading reference will result. It is for this reason that the relocated pole mode of operation is used.

FIGURE 7 shows the additional details of providing a voltage divider 721 not shown in FIGURE 3 to receive a signal from relay 152, when actuated by coil 152K, through connecting lead 160 which in turn provides a signal for amplifier 38 and synchro resolver 146. In like manner a voltage divider 722 not shown in FIGURE 3 is provided to receive a signal from relay 152 in its non-actuated position which is presented to amplifier 37 and resolver synchro 190. It will be noted that a pair of windings which are of like phase relationship are connected to ground and therefore not used in resolver 146 and nected to ground therefore not used in resolver 146 and this same scheme is also used in resolver 135. Resolver 190 has a second voltage divider 723 which is used to divide the voltage, one leg of the divider feeding one winding of resolver 190 and the other leg of the voltage divider providing an input signal to amplifier 36 whose output is applied across a winding of like phase to that just described. These same additional details are also found in FIGURES 13 and 15.

Comparing the operation of relay 657 (FIGURE 14) for the North gyro to that of relay 656 (FIGURE 8) for the East gyro it will be noted that the input to relay 657 is received on an armature 1062 which engages a relay contact 1064 to provide an output on a connecting lead 1073 to a rate demodulator 54. Also, relay contact 1060 is connected to ground through a resistor 1059 so that the only material change is that the input appears on the armature 1062 of relay 657 and is carried to the demodulator 54 through a relay contact whereas relay 656 receives the input on a contact 664 and carries the signal to the demodulator 53 through the armature 662.

From an examination of FIGURES 11 through 15, which illustrate hte longitude loop that involves the East accelerometer and North gyro, it can be seen that the description of the lattitude loop will suffice to describe the operation of the longitude loop by merely adding 400 to the reference numerals of the lattitude loop to obtain the similar operation of the longitude loop. As an example, FIGURE 5 shows pre-amplifier and demodulator 384 and discriminator 386 which are found in FIGURE 11 to be pre-amplifier and demodulator 784 and discriminator 786. Upon examination it will be seen that this scheme is applied to the longitudinal loop starting with reference numeral 785 to describe the operation and extends through reference numeral 1075, excluding all reference numerals in the 900 series. These numerals have been used to describe the operation of the circuits involving the azimuth gyro by adding 550 to the reference numerals of the latitude loop as shown in FIGURE 10.

FIGURE 16 shows the inertial platform containing the various components and also shows the flow of information between the various components. However, the flow of information is actually channeled through the computer portion of the system before reaching its final destination and this has not been shown but it is implied in the flow of information.

The inertial platform comprises an upper platform 724 which has mounted upon it East gyro 231, North gyro 247, and North accelerometer 70. The lower platform contains East accelerometer 71 and Azimuth gyro 242. It should be noted that North accelerometer 70 and North gyro 247 have their input axes parallel with each other and at right angles to East gyro 231 and East accelerometer 71, which has its input axis parallel to that of East gyro 231. Azimuth gyro 242 has its input axis perpendicular to the plane formed by the other input axes of the other four components. The upper and lower platform are fixedly joined by a common shaft which is journalled in a knuckle joint 726 which is pivoted about an inner roll axis which is limited in its rotation due to to the fact that it is journalled in a ring portion of pitch gimbal 727. Pitch gimbal 727 is supported by an outer roll gimbal 728 at a point which is at right angles to the inner roll axis. Outer roll gimbal 728 is pivoted at a point perpendicular to pitch axis 727 and parallel to the inner roll axis. It is supported by the outer housing which is shown as a pair of legs 729 and 739.

While certain servos have been shown in the longitude and lattitude loop circuits, other platform servos were purposely omitted and will be described at this time. The signals from the East gyro 231 and North gyro 247 which are signals from the error pickoffs, are sent to pitch and roll resolver 447 through leads 730 and 731 respectively. Gear 732 attached to azimuth servomotor 966 drives gear 733 attached to azimuth synchro 974 and though a pair of larger gears 734 and 735 to reach gear 736 which is attached to pitch and roll resolver synchro 447. The output of resolver synchro 447 is sent to pitch servomotor 466 through the connecting lead 740 and is sent to an inner roll servomotor 866 through a connecting lead 741. The signal from the error pickoff of azimuth gyro 242 is sent to azimuth servomotor 966 through a lead 737 so that the azimuth servomotor is driven to a correct azimuth position. Thus the platform is erected (levled) about the pitch axis and has the upper and lower platform erected about the inner roll axis which is limited in its rotational freedom. The amount of the inner platform is rotated in roll is detected by an inner roll pickoff 742 which is in the form of a synchro and this signal is sent to an outer roll servomotor 743 through a connecting lead 744. Since the platform has only limited movement about the inner roll axis, because of the ring portion of the pitch gimbal 727, the outer roll servo motor 743 is connected to maintain the inner roll pickoff 742 approximately at its null position by rotating the outer roll gimbal 728, and, thus the pitch gimbal 727, in a direction to compensate for the movement of the platform about the inner roll axis. Simultaneously roll synchro 874 (FIGURE 14) supplies a signal to a roll synchro differential 745 through a connecting lead 746 where the signal is combined with an external signal which would appear on a connecting lead 747 and the output signal is sent to inner roll servomotor 866 through a connecting lead 750.

Thus outer roll servomotor 743 erects gimbal 728 to a point where the platform remains level.

Figure 17:
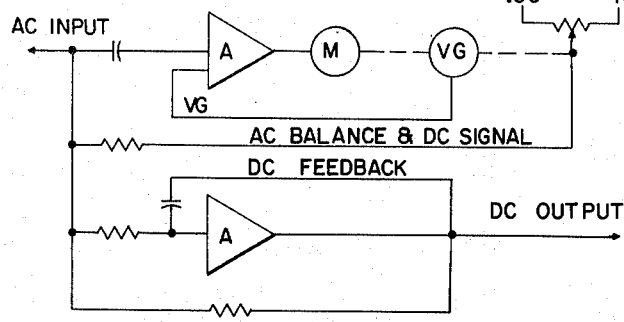
FIGURE 17 is a block diagram of the A.C.-D.C. converters which are used throughout the system.
Figure 18:
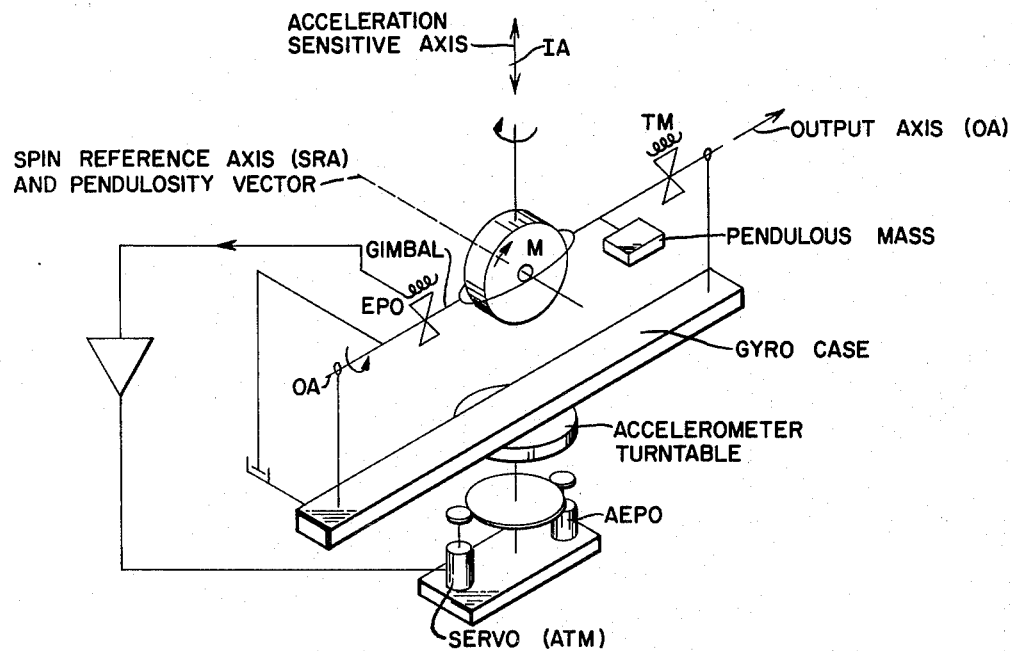
FIGURE 18 is a somewhat schematic representation of a pendulous gyro accelerometer.

FIGURE 17 is a functional diagram of the A.C.–D.C. converter used in various parts of the system. The function of the A.C.–D.C. converter is to produce a direct current signal of polarity and magnitude precisely corresponding to the magnitude of an alternating current input signal. In this device, a reference voltage created by direct current is superimposed upon a reference alternating voltage produced by an alternating current and is impressed across a potentiometer. The movable tap of the potentiometer is positioned by a servo so that the alternating current signal from the tap corresponds to the alternating current input signal. At this point, the direct current signal on the tap also corresponds to the alternating current input signal. This direct current signal may then be applied to the amplifier of an integrator as the output of the converter. The details of the servo and integrator connections are such that a constant load is applied to the potentiometer at a steady state condition. For a more detailed description of the structure and operation of the device reference is made to co-pending application 726,995, filed April 7, 1958, now Patent No. 2,950,429, by Henry W. Berry, and assigned to the same assignee as the present application.

While not specifically shown, the amplifiers of the detailed circuits will be internally connected to ground where necessary since this will be evident to those skilled in the art. Certain shafts have been shown with no specific reference made to gearing between components and the shafts; however, appropriate gearing will be implied to exist where applicable.

Specific attention is called to the A.C.–D.C. converters and amplifiers which have multiple inputs. For purposes of clarity, summing boards in the form of impedance elements are used to sum the various signals before being presented to the input circuits of the converters and amplifiers, and these are contained within the components although not shown.

While we have shown and described a specific embodiment of this invention, the invention should not be limited to the particular form shown and we intend in the appended claims to cover all modifications which do not depart from the spirit and scope of the invention.

We claim:

1. A dirigible craft navigation system comprising: means stabilized with respect to local vertical having three degrees of rotational freedom; acceleration sensing means contained on said stabilized means for sensing accelerations and producing output signals representative thereof; first biasing means including means supplying signals representative of the opposite sense of acceleration caused by centripetal and Coriolis forces for applying bias signals to said acceleration sensing means to refer said output signals from local vertical coordinates to earth coordinates; means connecting said first biasing means to said acceleration sensing means; altitude correction means adapted to have a signal applied representative of the distance of said craft from the surface of the earth and providing output signals therefrom representative of the distance of said craft from the center of the earth plus the average change in radius of the earth; first integrating means responsive to said output signals from said acceleration sensing means and coupled to said altitude correction means for modifying the integrated output signals in accordance with the distance of said craft from the center of the earth so that the resultant signals are representaive of the latitude and longitude rate of said craft; second integrating means responsive to said resultant signals for producing output signals representative of the longitude and latitude of said craft; second biasing means adapted to have a signal representative of earth rate applied thereto and providing an output signal therefrom; rotation signal generating means responsive to said resultant signals and to signal from said second integrating means and said second biasing means for producing signals that are referred to local vertical coordinate axes to rotate said stabilized means; means connecting said rotation signal generating means to said stabilized means; and indicating means responsive to the output signals from said second integrating means to provide indication of the geographical latitude and longitude of said craft.

2. A dirigible craft navigation system comprising: means stabilized with respect to local vertical having three degrees of rotational freedom; pendulous acceleration sensing means including first integrating means contained on said stabilized means for sensing accelerations and producing output signals representative of the integral of said accelerations; first biasing means including means supplying signals representaive of the opposite sense of accelerations caused by centripetal and Coriolis forces for applying bias signals to said acceleration sensing means to refer said output signals from local vertical coordinates to earth coordinates; means connecting said first biasing means to said acceleration sensing means; converting means responsive to said output signals from said pendulous acceleration sensing means including means for modifying said signals in accordance with the distance of said craft from the center of the earth so that the output signals are representative of the latitude and longitude rate of said craft; second integrating means responsive to said output signals of said first integrating means for producing output signals representative of the longitude and latitude of said craft; second biasing means adapted to have a signal representative of earth rate applied thereto and providing an output signal therefrom; rotation signal generating means responsive to signals from said second integrating means, said converting means and said second biasing means for producing signals that refer to local vertical coordinate axes to rotate said stabilized means; means connecting said rotation signal generating means to said stabilized means; and indicating means responsive to the output signals from said second integrating means to provide indication of the latitude and longitude of said craft.

3. A dirigible craft navigation system comprising: gyro means stabilized with respect to local vertical having three degrees of rotational freedom; acceleration sensing means contained on said stabilized means for sensing accelerations and producing output signals representative thereof; first biasing means including means supplying signals representative of the opposite sense of accelerations caused by centripetal and Coriolis forces for applying bias signals to said acceleration sensing means to refer said output signals from local vertical coordinates to earth coordinates; means connecting said first biasing means to said acceleration sensing means; first integrating means responsive to said acceleration output signals having in connection therewith means for modifying the integrated signals in accordance with the distance of said craft from the center of the earth so that the resultant signals are representative of the latitude and longitude rate of said craft; second integrating means responsive to said resultant signals for producing output signals representative of the longitude and latitude of said craft; second biasing means adapted to have a signal representative of earth rate applied thereto and providing an output signal therefrom; rotation signal generating means responsive to said resultant signals and to signals from said second integrating means and said second biasing means for producing signals that are referred to local vertical coordinate axes to rotate said gyro stabilized means; means connecting said rotation signal generating means to said gyro stabilized means; and indicating means responsive to the output signals from said second integrating means to provide indication of the geographical latitude and longitude of said craft.

4. A dirigible craft navigation system comprising: platform means stabilized with respect to local vertical having three degrees of rotational freedom; acceleration sensing means contained on said platform means for sensing accelerations and producing output signals representative thereof; first biasing means including means supplying signals representative of the opposite sense of accelerations caused by centripetal and Coriolis forces for applying bias signals to said acceleration sensing means to refer said output signals from local vertical coordinates to earth coordinates; means connecting said first biasing means to said acceleration sensing means; first integrating means responsive to said acceleration output signals having in connection therewith means for modifying the integrated signals in accordance with the distance of said craft from the center of the earth so that the resultant signals are representative of the geographical latitude and longitude rate of said craft; second integrating means responsive to said resultant signals for producing output signals representative of the geographical longitude and latitude of said craft; second biasing means adapted to have a signal representative of earth rate applied thereto and producing output signals therefrom; rotation signal generating means responsive to said resultant signals and to signals from said second integrating means and said second biasing means for producing signals that refer to local vertical coordinate axes to rotate said platform means; means connecting said rotation signal generating means to said platform means; and means responsive to the output signals from said second integrating means to provide signals representative of the geographical latitude and longitude of said craft.

5. A dirigible craft navigation system for indicating the position of said craft on the earth relative to an initial position comprising: acceleration measuring means for measuring the inertial acceleration of said craft in north and east coordinates and providing signals representative thereof; converting means including means supplying signals representative of the opposite sense of accelerations caused by centripetal and Coriolis forces and first integrating means responsive to signals from said acceleration measuring means for converting said north and east inertial acceleration signals into signals representative of north and east angular velocities of said craft; second integrating means responsive to said north and east angular velocity signals for producing output signals representative of distance along a meridian and of distance parallel to the equator; stable reference means for providing a vertical reference and orienting said acceleration measuring means in a north and east direction, said stable reference means supporting said acceleration measuring means; modifying means having an input and an output and adapted to have a signal representative of earth rate applied to the input; torquing signal generating means responsive to said north and east angular velocity signals, to said signal representative of distance along a meridian, and to the output of said modifying means for providing stable reference torquing signals; means connecting said torquing signal generating means to torque said stable reference means so that said stable reference means is rotated to maintain said platform stable with reference to local vertical coordinate axes; and means responsive to said signals from said second integrating means to provide indication of the latitude and longitude of said craft.

6. A dirigible craft navigation system for indicating the position of said craft on the earth relative to an initial position comprising: acceleration measuring means including integrating means for measuring the acceleration of said craft in north and east coordinates and providing signals representative of north and east velocities; converting means responsive to signals from said acceleration measuring means including means supplying signals representative of the opposite sense of acceleration caused by centripetal and Coriolis forces for converting said north and east velocity signals into signals representative of north and east angular velocities of said craft; second integrating means responsive to said north angular velocity signal for producing an output signal representative of distance along a meridian; third integrating means responsive to said east angular velocity signal for producing an output signal representative of distance parallel to the equator; stable reference means including gyro means for stabilization thereof for providing a vertical reference and orienting said acceleration measuring means in a north and east direction, said stable reference means supporting said acceleration measuring means; modifying means having an output and adapted to have a signal representative of earth rate applied to the input; torquing signal generating means responsive to said north and east angular velocity signals, to said signal representative of distance along a meridian, and to said output of said modifying means for providing stable reference torquing signals; means connecting said torquing signal generating means to said stable reference means so that said stable reference means is rotated to maintain said platform stable with relation to local vertical coordinate axes; and indicating means responsive to said signals from said second and third integrating means to display the latitude and longitude position of said craft.

7. A dirigible craft navigation system for indicating the position of said craft on the earth relative to an initial position comprising: velocity measuring means for measuring the velocity of said craft in north and east coordinates and providing signals representative thereof; converting means responsive to signals from said velocity measuring means including means supplying signals representative of the opposite sense of accelerations caused by centripetal and Coriolis forces for converting said north and east velocity signals into signals representative of geographical angular velocities north and east; first integrating means responsive to said north angular velocity signal for producing an output signal representative of distance along a meridian; second integrating means responsive to said east angular velocity signal for producing an output signal representative of distance parallel to the equator; stable reference means for providing a vertical reference and orienting said velocity measuring means in a north and east direction, said stable reference means supporting said velocity measuring means; modifying means having an input and an output and adapted to have a signal representative of earth rate applied to said input; torquing signal generating means responsive to said north and east angular velocity signals, to said signal representative of distance along a meridian, and to said output of said modifying means for providing stable reference torquing signals; and means connecting said torquing signal generating means to said stable reference means so that said stable reference means is rotated to maintain said reference means stable in a local vertical coordinate system.

8. A dirigible craft navigation system for indicating the position of said craft on the earth relative to an initial position comprising: velocity measuring means for measuring the velocity of said craft by measuring the amplitude of a first and second component of said velocity and providing signals representative thereof; converting means responsive to signals from said velocity measuring means including means supplying signals which substantially counteract the effects of accelerations caused by centripetal and Coriolis forces for converting said first and second component signals into signal representative of first and second geographical angular velocities of said craft; first integrating means responsive to said first angular velocity signal for producing an output signal representative of distance along a meridian; second integrating means responsive to said second angular velocity signal for producing an output signal representative of distance parallel to the equator; stable reference means for providing a vertical reference and orienting said velocity measuring means in a first and second direction, said reference means supporting said velocity measuring means; constant earth rate signal generating means for providing a signal representative thereof; torquing signal generating means responsive to said first and second geographical angular velocity signals, to said signal representative of distance along a meridian, and to said constant rate signal for providing stable reference torquing signals; means connecting said torquing signal generating means to said stable reference means so that said stable reference means is rotated to maintain said reference means stable in a local vertical coordinate system; and indicating means responsive to said signals from said first and second integrating means to display the latitude and longitude position of said craft.

9. A dirigible craft navigation system comprising: a stabilized platform with three degrees of rotational freedom having north, east, and azimuth gyros mounted on said platform so their input axes define north, east and azimuth axes of said platform; north and east integrating accelerometers each having an input axis and mounted on said platform with the input axes of said north and east accelerometers parallel to said respective north and east axes for sensing horizontal north and east accelerations and producing output signals which are the integral of said accelerations; a first modifying means having an output signal and an input and adapted to have a signal representative of altitude applied to the input; a north and east divider each responsive to the signals from said north and east accelerometers respectively and to the output signal from said first modifying means for producing a pair of signals, the first of which is representative of latitude rate and the second of which is representative of longitude rate multiplied by the cosine of local latitude; means connecting said north divider to said east gyro causing said east gyro to produce a signal applicable for torquing said platform about horizontal axes; a first integrator responsive to said latitude rate signal for producing an output signal representative of latitude; a latitude indicator connected to said first integrator for displaying the latitude position of said dirigible craft; a cosine divider including a first resolver and responsive to said output signals from said first integrator and said east divider for producing a pair of output signals representative of longitude rate, and longitude rate multiplied by the sine of local latitude; a second integrator responsive to said longitude rate signal from said cosine divider for producing an output signal representative of longitude; a longitude indicator connected to said second integrator for displaying the longitude position of said dirigible craft; a second modifying means having an output signal and an input and adapted to have a signal representative of earth rate applied to the input; a second resolver responsive to said longitude rate signal from said cosine divider, said output signal from said first integrator, and the output signal of said second modifying means, for producing north and azimuth gyro precession signals; means connecting said second resolver to said north and azimuth gyros causing said north and azimuth gyros to produce signals applicable for torquing said platform about the horizontal axes and about said azimuth axis, respectively; a third modifying means having an output signal and an input and adapted to have a signal representative of altitude rate applied to the input; a correction signal generator for producing signals in accordince with centripetal acceleration and the Coriolis acceleration, said correction signal generator being excited by the output signal of said third modifying means, said precession signals from said second resolver, said latitude rate signal from said north divider, the output signals from said integrating accelerometers, said signal representative of longitude rate multiplied by the sine of local latitude from said cosine divider, and said signal from said east divider; means connecting said correction signal generator to said pair of accelerometers; and means connecting said first, second, and third modifying means to said north and east dividers, to said second resolver, and to said correction signal generator respectively.

10. A dirigible craft navigation system comprising: a stabilized platform with three degrees of rotational freedom having three gyros mounted on said platform so their input axes define first, second and third orthogonal axes of said platform; a pair of integrating accelerometers each having an input axis and mounted on said platform with their input axes perpendicular to each other and parallel to said first and second platform axes for sensing horizontal accelerations and producing a pair of output signals which are the integral of said horizontal accelerations; a first modifying means having an output signal and an input and adapted to have a signal representative of altitude applied to the input; a first and second divider each responsive to one signal from said pair of accelerometers and said output signal from said first modifying means for producing a pair of signals, the first of which is representative of latitude rate and the second of which is representative of longitude rate multiplied by the cosine of local latitude; means connecting said first divider producing a latitude rate signal to the first said three gyros for producing a signal applicable to rotate said platform about horizontal axes; a first integrator responsive to said latitude rate signal for producing an output signal representative of the integral of latitude rate; a latitude indicator connected to said first integrator for displaying the latitude position of said dirigible craft; a cosine divider including a first resolver and responsive to said output signals from said first integrator and said second divider for producing a pair of output signals representative of longitude rate, and longitude rate multiplied by the sine of local latitude; a second integrator responsive to said longitude rate signal from said cosine divider for producing an output signal representative of the integral of longitude rate; a longitude indicator connected to said second integrator for displaying the longitude position of said dirigible craft; a second modifying means having an output signal and an input and adapted to have a signal representative of earth rate applied to the input; a second resolver responsive to said longitude rate signal from said cosine divider, said output signal from said first integrator, and said output signal from said second modifying means, for producing a pair of gyros precession signals; means connecting said second resolver to said second and third gyros for producing signals applicable to rotate said platform about horizontal axes and about azimuth axis, respectively; a third modifying means having an output signal and an input and adapted to have a signal representative of altitude rate applied to the input; a correction signal generator for producing signals in accordance with centripetal acceleration and the Coriolis acceleration, said correction signal generator being excited by the output signal from said third modifying means, said precession signals from said second resolver, said latitude rate signal from said first divider, the output signals from said integrating accelerometers, said signal representative of longitude rate multiplied by the sine of local latitude from said cosine divider, and said signal from said second divider; means connecting said correction signal generator to said pair of accelerometers; and means connecting said first, second, and third modifying means to said north and east dividers, to said second resolver, and to said correction signal generator respectively.

11. A dirigible craft navigation system comprising: a stabilized platform with three degrees of rotational freedom having three orthogonal axes defined thereon; a pair of pendulous gyro integrating accelerometers each having an input axis and mounted on said platform with their input axes perpendicular to each other and parallel to said first and second orthogonal axes for sensing horizontal accelerations and producing output signals which are the integral of said horizontal accelerations; a first modifying means having an output signal and an input and adapted to have a signal representative of altitude applied to the input; a first and second divider each responsive to one signal from said pair of accelerometers and said output signal from said first modifying means for producing a pair of signals, a first of which is representative of latitude rate and the second of which is representative of longitude rate multiplied by the cosine of local latitude; means connected to the signal output of said first divider for rotating said platform about horizontal axes; a first integrator responsive to said latitude rate signal for producing an output signal representative of the integral of latitude rate; a latitude indicator connected to said first integrator for displaying the latitude position of said dirigible craft; a cosine divider including a first resolver and responsive to said output signals from said first integrator and said second divider for producing a pair of output signals representative of longitude rate, and longitude rate multiplied by the sine of local latitude; a second integrator responsive to said longitude rate signal from said cosine divider for producing an output signal representative of the integral of longitude rate; a longitude indicator connected to said second integrator for displaying the longitude position of said dirigible craft; a second modifying means having an output signal and an input and adapted to have a signal representative of earth rate applied to the input; a second resolver responsive to said longitude rate signal from said cosine divider, said output signal from said first integrator, and said output signal from said second modifying means for producing a pair of platform rotation signals; means connected for actuation by said last named pair of singles for rotating said platform about said horizontal axes and about an azimuth axis, respectively; a third modifying means having an output signal and an input and adapted to have a signal representative of altitude rate applied to the input; a first correction signal generator for producing signals in accordance with centripetal acceleration and the Coriolis acceleration, said first correction signal generator being excited by the output signal from said third modifying means, said rotation signals from said second resolver, said latitude rate signal from said first divider, the output signals from said integrating accelerometers, said signal representative of longitude rate multiplied by the sine of local latititude from said cosine divider, and said signal from said second divider; a second correction signal generator for producing signals to compensate said pendulous gyro integrating accelerometers for the effect of platform rotation on said accelerometers; means connecting said first and second cerrection signal generators to said pair of accelerometers; and means connecting said first, second, and third modifying means to said north and east dividers, to said second resolver, and to said first correction signal generator respectively.

12. A dirigible craft navigation system comprising: a stabilized platform with three degrees of rotational freedom having three orthogonal axes defined thereon; a pair of integrating accelerometers each having an input axis and mounted on said platform with their input axes perpendicular to each other and parallel to said first and second orthogonal axes for sensing horizontal accelerations and producing output signals which are the integral of said horizontal accelerations; a first modifying means having an output signal and an input and adapted to have a signal representative of altitude applied to the input; a first and second divider each responsive to a signal from one of said accelerometers and to said output signal from said first modifying means for producing a pair of signals, the first of which is representative of latitude rate and the second of which is representative of longitude rate multiplied by the cosine of local latitude; means connected to the signal output of said first divider for rotating said platform about horizontal axes; a first integrator responsive to said latitude rate signal for producing an output signal representative of the integral of latitude rate; a first signal transmitter connected to said first integrator for transmiting a signal representative of the latitude position of said dirigible craft; a cosine divider including a first resolver and responsive to said output signals from said first integrator and said second divider for producing a pair of output signals representative of longitude rate, and longitude rate multiplied by the sine of local latitude; a second integrator responsive to said longitude rate signal from said cosine divider for producing an output signal representative of the integral of longitude rate; a second signal transmitter connected to said second integrator for transmitting a signal representative of the longitude position of said dirigible craft; a second modifying means having an output signal and an input and adapted to have a signal representative of earth rate applied to the input; a second resolver responsive to said longitude rate signal from said cosine divider, to said output signal from said first integrator, and said output signal from said second modifying means for producing a pair of platform rotation signals; means connected for actuation by said last named pair of singles for rotating said platform about said horizontal axes and an azimuth axis, respectively; a third modifying means having an output signal and an input and adapted to have a signal representative of altitude rate applied to the input; a correction signal generator for producing signals in accordance with the Coriolis acceleration, said correction signal generator being excited by the output signal from said third modifying means, said rotation signals from said second resolver, said latitude rate signal from said first divider, the output signals from said integrating accelerometers, said signal representative of longitude rate multiplied by the sine of local latitude from said cosine divider, and said signal from said second divider; means connecting said correction signal generator to said pair of accelerometers; and means connecting said first, second, and third modifying means to said north and east dividers, to said second resolver, and to said correction signal generator respectively.

13. A dirigible craft navigation system comprising: a stabilized platform with three degrees of rotational freedom having north, east, and azimuth gyros mounted on said platform so their input axes define north, east and azimuth axes of said platform; north and east integrating accelerometers each having an input axis and mounted on said platform with the input axes of said north and east accelerometers parallel to said respective north and east axes for sensing horizontal north and east accelerations and producing output signals which are the integral of said accelerations; a first modifying means having an output signal and an input and adapted to have a signal representative of altitude applied to said input; a north and east divider each responsive to the signals from said north and east accelerometers respectively and to the output of said first modifying means for producing a pair of signals, the first of which is representative of latitude rate and the second of which is representative of longitude rate multiplied by the cosine of local latitude; means connecting said north divider to said east gyro causing said east gyro to produce a signal applicable for torquing said platform about horizontal axes; a first integrator responsive to said latitude rate signal for producing an output signal representative of latitude; a latitude indicator connected to said first integrator for displaying the latitude position of said dirigible craft; a cosine divider including a first resolver and responsive to said output signals from said first integrator and said east divider for producing a pair of output signals representative of longitude rate, and longitude rate multiplied by the sine of local latitude; a second integrator responsive to said longitude rate signal from said cosine divider for producing an output signal representative of longitude; a longitude indicator connected to said second integrator for displaying the longitude position of said dirigible craft; a second modifying means having an output signal and an input and adapted to have a signal representative of earth rate applied to the input; a second resolver responsive to said longitude rate signal from said cosine divider, said output signal from said first integrator, and the output signal from said second modifying means, for producing north and azimuth gyro precession signals; means connecting said second resolver to said north and azimuth gyros causing said north and azimuth gyros to produce signals applicable for torquing said platform about said horizontal axes and an azimuth axis, respectively; a third modifying means having an output signal and an input and adapted to have a signal representative of altitude rate applied to the input; a correction signal generator for producing signals in accordance with centripetal acceleration, said correction signal generator being excited by the output signal from said third modifying means, said precession signals from said second resolver, said latitude rate signal from said north divider, the output signals from said integrating accelerometers, said signal representative of longitude rate multiplied by the sine of local latitude from said cosine divider, and said signal from said east divider; means connecting said correction signal generator to said pair of accelerometers; and means connecting said first, second, and third modifying means to said north and east dividers, to said second resolver, and to said correction signal generator respectively.

References Cited by the Examiner

UNITED STATES PATENTS

| | | | |
|---|---|---|---|
| 1,760,609 | 5/1930 | Rowan et al. | 33—126.6 |
| 2,704,401 | 3/1955 | Mohr et al. | 33—126.6 |
| 2,752,792 | 7/1956 | Draper et al. | 74—5.34 |
| 2,835,131 | 5/1958 | Vacquier et al. | 74—5.37 |
| 2,906,026 | 9/1959 | Hanes | 33—126.6 |
| 2,936,627 | 5/1960 | Wing et al. | 74—5.34 |
| 2,977,804 | 4/1961 | French | 73—178 X |
| 3,050,995 | 8/1962 | Dozier | 33—226 |

FOREIGN PATENTS

| | | |
|---|---|---|
| 153,479 | 10/1953 | Australia. |
| 153,497 | 10/1953 | Australia. |

ROBERT B. HULL, *Primary Examiner.*

A. M. HORTON, SAMUEL BOYD, ISAAC LISANN,
*Examiners.*